(12) United States Patent
Kalra et al.

(10) Patent No.: US 11,580,667 B2
(45) Date of Patent: Feb. 14, 2023

(54) SYSTEMS AND METHODS FOR CHARACTERIZING OBJECT POSE DETECTION AND MEASUREMENT SYSTEMS

(71) Applicant: Intrinsic Innovation LLC, Mountain View, CA (US)

(72) Inventors: Agastya Kalra, Nepean (CA); Achuta Kadambi, Los Altos Hills, CA (US); Kartik Venkataraman, San Jose, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 0 days.

(21) Appl. No.: 17/529,042

(22) Filed: Nov. 17, 2021

(65) Prior Publication Data
US 2022/0076449 A1 Mar. 10, 2022

Related U.S. Application Data

(63) Continuation of application No. 17/279,339, filed as application No. PCT/US2020/063044 on Dec. 3, 2020, now Pat. No. 11,195,303.
(Continued)

(51) Int. Cl.
*G06K 9/00* (2022.01)
*G06T 7/73* (2017.01)
(Continued)

(52) U.S. Cl.
CPC ............... *G06T 7/75* (2017.01); *G06T 7/593* (2017.01); *G06T 19/20* (2013.01); *G06T 2219/2004* (2013.01)

(58) Field of Classification Search
CPC .. G06T 2207/30244; G06T 2207/10028; G06T 7/73; G06T 2207/10016;
(Continued)

(56) References Cited

U.S. PATENT DOCUMENTS

| 4,124,798 A | 11/1978 | Thompson |
| 4,198,646 A | 4/1980 | Alexander et al. |

(Continued)

FOREIGN PATENT DOCUMENTS

| CN | 2488005 Y | 4/2002 |
| CN | 1619358 A | 5/2005 |

(Continued)

OTHER PUBLICATIONS

US 8,957,977, 8/2014, Venkataraman, Kartik et al
(Continued)

*Primary Examiner* — Alex Kok S Liew
(74) *Attorney, Agent, or Firm* — Fish & Richardson P.C.

(57) ABSTRACT

A method for characterizing a pose estimation system includes: receiving, from a pose estimation system, first poses of an arrangement of objects in a first scene; receiving, from the pose estimation system, second poses of the arrangement of objects in a second scene, the second scene being a rigid transformation of the arrangement of objects of the first scene with respect to the pose estimation system; computing a coarse scene transformation between the first scene and the second scene; matching corresponding poses between the first poses and the second poses; computing a refined scene transformation between the first scene and the second scene based on coarse scene transformation, the first poses, and the second poses; transforming the first poses based on the refined scene transformation to compute transformed first poses; and computing an average rotation error and an average translation error of the pose estimation
(Continued)

system based on differences between the transformed first poses and the second poses.

18 Claims, 6 Drawing Sheets

Related U.S. Application Data

(60) Provisional application No. 62/967,487, filed on Jan. 29, 2020.

(51) Int. Cl.
  *G06T 7/593* (2017.01)
  *G06T 19/20* (2011.01)
(58) Field of Classification Search
  CPC .. G06T 7/246; G06T 7/74; G06T 7/70; G06T 19/006; G06T 7/579; G06T 17/00; G06T 2207/10021; G06T 7/55; G06T 2207/20016; G06T 7/277; G06T 15/005; G06T 2207/20076; G06T 2207/30252; G06T 7/85; G06T 7/593; G06T 7/75; G06F 3/011; G06F 3/012; G06F 3/04815; G06F 3/147; G06F 3/1423; G06F 3/1454; G06F 16/51; G06V 20/10; G06V 10/462; G06V 20/64; G06V 10/757; G06V 20/20; G06V 20/647
  See application file for complete search history.

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 4,652,909 A | 3/1987 | Glenn |
| 4,888,645 A | 12/1989 | Mitchell et al. |
| 4,899,060 A | 2/1990 | Lischke |
| 4,962,425 A | 10/1990 | Rea |
| 5,005,083 A | 4/1991 | Grage et al. |
| 5,070,414 A | 12/1991 | Tsutsumi |
| 5,144,448 A | 9/1992 | Hornbaker et al. |
| 5,157,499 A | 10/1992 | Oguma et al. |
| 5,325,449 A | 6/1994 | Burt et al. |
| 5,327,125 A | 7/1994 | Iwase et al. |
| 5,463,464 A | 10/1995 | Ladewski |
| 5,475,422 A | 12/1995 | Suzuki et al. |
| 5,488,674 A | 1/1996 | Burt et al. |
| 5,517,236 A | 5/1996 | Sergeant et al. |
| 5,629,524 A | 5/1997 | Stettner et al. |
| 5,638,461 A | 6/1997 | Fridge |
| 5,675,377 A | 10/1997 | Gibas et al. |
| 5,703,961 A | 12/1997 | Rogina et al. |
| 5,710,875 A | 1/1998 | Hsu et al. |
| 5,757,425 A | 5/1998 | Barton et al. |
| 5,793,900 A | 8/1998 | Nourbakhsh et al. |
| 5,801,919 A | 9/1998 | Griencewic |
| 5,808,350 A | 9/1998 | Jack et al. |
| 5,832,312 A | 11/1998 | Rieger et al. |
| 5,833,507 A | 11/1998 | Woodgate et al. |
| 5,880,691 A | 3/1999 | Fossum et al. |
| 5,911,008 A | 6/1999 | Niikura et al. |
| 5,933,190 A | 8/1999 | Dierickx et al. |
| 5,963,664 A | 10/1999 | Kumar et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,084,979 A | 7/2000 | Kanade et al. |
| 6,095,989 A | 8/2000 | Hay et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu |
| 6,175,379 B1 | 1/2001 | Uomori et al. |
| 6,185,529 B1 | 2/2001 | Chen et al. |
| 6,198,852 B1 | 3/2001 | Anandan et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,340,994 B1 | 1/2002 | Margulis et al. |
| 6,358,862 B1 | 3/2002 | Ireland et al. |
| 6,373,518 B1 | 4/2002 | Sogawa |
| 6,419,638 B1 | 7/2002 | Hay et al. |
| 6,443,579 B1 | 9/2002 | Myers |
| 6,445,815 B1 | 9/2002 | Sato |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,546,153 B1 | 4/2003 | Hoydal |
| 6,552,742 B1 | 4/2003 | Seta |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu et al. |
| 6,627,896 B1 | 9/2003 | Hashimoto et al. |
| 6,628,330 B1 | 9/2003 | Lin |
| 6,628,845 B1 | 9/2003 | Stone et al. |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,674,892 B1 | 1/2004 | Melen |
| 6,750,488 B1 | 6/2004 | Driescher et al. |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev et al. |
| 6,795,253 B2 | 9/2004 | Shinohara |
| 6,801,653 B1 | 10/2004 | Wu et al. |
| 6,819,328 B1 | 11/2004 | Moriwaki et al. |
| 6,819,358 B1 | 11/2004 | Kagle et al. |
| 6,833,863 B1 | 12/2004 | Clemens |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,917,702 B2 | 7/2005 | Beardsley |
| 6,927,922 B2 | 8/2005 | George et al. |
| 6,958,862 B1 | 10/2005 | Joseph |
| 6,985,175 B2 | 1/2006 | Iwai et al. |
| 7,013,318 B2 | 3/2006 | Rosengard et al. |
| 7,015,954 B1 | 3/2006 | Foote et al. |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,215,364 B2 | 5/2007 | Wachtel et al. |
| 7,235,785 B2 | 6/2007 | Hornback et al. |
| 7,245,761 B2 | 7/2007 | Swaminathan et al. |
| 7,262,799 B2 | 8/2007 | Suda |
| 7,292,735 B2 | 11/2007 | Blake et al. |
| 7,295,697 B1 | 11/2007 | Satoh |
| 7,333,651 B1 | 2/2008 | Kim et al. |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen et al. |
| 7,430,312 B2 | 9/2008 | Gu |
| 7,471,765 B2 | 12/2008 | Jaffray et al. |
| 7,496,293 B2 | 2/2009 | Shamir et al. |

(56) References Cited

U.S. PATENT DOCUMENTS

| | | |
|---|---|---|
| 7,564,019 B2 | 7/2009 | Olsen et al. |
| 7,599,547 B2 | 10/2009 | Sun et al. |
| 7,606,484 B1 | 10/2009 | Richards et al. |
| 7,620,265 B1 | 11/2009 | Wolff et al. |
| 7,633,511 B2 | 12/2009 | Shum et al. |
| 7,639,435 B2 | 12/2009 | Chiang |
| 7,639,838 B2 | 12/2009 | Nims |
| 7,646,549 B2 | 1/2010 | Zalevsky et al. |
| 7,657,090 B2 | 2/2010 | Omatsu et al. |
| 7,667,824 B1 | 2/2010 | Moran |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,924,321 B2 | 4/2011 | Nayar et al. |
| 7,956,871 B2 | 6/2011 | Fainstain et al. |
| 7,965,314 B1 | 6/2011 | Miller et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,055,466 B2 | 11/2011 | Bryll |
| 8,077,245 B2 | 12/2011 | Adamo et al. |
| 8,089,515 B2 | 1/2012 | Chebil et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,111,910 B2 | 2/2012 | Tanaka |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,149,323 B2 | 4/2012 | Li et al. |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev et al. |
| 8,194,296 B2 | 6/2012 | Compton et al. |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,284,240 B2 | 10/2012 | Saint-Pierre et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,294,754 B2 | 10/2012 | Jung et al. |
| 8,300,085 B2 | 10/2012 | Yang et al. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev et al. |
| 8,406,562 B2 | 3/2013 | Bassi et al. |
| 8,411,146 B2 | 4/2013 | Twede |
| 8,416,282 B2 | 4/2013 | Lablans |
| 8,446,492 B2 | 5/2013 | Nakano et al. |
| 8,456,517 B2 | 6/2013 | Spektor et al. |
| 8,493,496 B2 | 7/2013 | Freedman et al. |
| 8,514,291 B2 | 8/2013 | Chang |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,558,929 B2 | 10/2013 | Tredwell |
| 8,559,705 B2 | 10/2013 | Ng |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,648,919 B2 | 2/2014 | Mantzel et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,754,941 B1 | 6/2014 | Sarwari et al. |
| 8,773,536 B1 | 7/2014 | Zhang |
| 8,780,113 B1 | 7/2014 | Ciurea et al. |
| 8,787,691 B2 | 7/2014 | Takahashi et al. |
| 8,792,710 B2 | 7/2014 | Keselman |
| 8,804,255 B2 | 8/2014 | Duparre |
| 8,823,813 B2 | 9/2014 | Mantzel et al. |
| 8,830,375 B2 | 9/2014 | Ludwig |
| 8,831,367 B2 | 9/2014 | Venkataraman et al. |
| 8,831,377 B2 | 9/2014 | Pitts et al. |
| 8,836,793 B1 | 9/2014 | Kriesel et al. |
| 8,842,201 B2 | 9/2014 | Tajiri |
| 8,854,433 B1 | 10/2014 | Rafii |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,885,922 B2 | 11/2014 | Ito et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,030,528 B2 | 5/2015 | Pesach et al. |
| 9,031,335 B2 | 5/2015 | Venkataraman et al. |
| 9,031,342 B2 | 5/2015 | Venkataraman |
| 9,031,343 B2 | 5/2015 | Venkataraman |
| 9,036,928 B2 | 5/2015 | Venkataraman |
| 9,036,931 B2 | 5/2015 | Venkataraman et al. |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman et al. |
| 9,047,684 B2 | 6/2015 | Lelescu et al. |
| 9,049,367 B2 | 6/2015 | Venkataraman et al. |
| 9,055,233 B2 | 6/2015 | Venkataraman et al. |
| 9,060,120 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,100,586 B2 | 8/2015 | McMahon et al. |
| 9,100,635 B2 | 8/2015 | Duparre et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Florian et al. |
| 9,185,276 B2 | 11/2015 | Rodda et al. |
| 9,188,765 B2 | 11/2015 | Venkataraman et al. |

(56) References Cited

U.S. PATENT DOCUMENTS

| | | |
|---|---|---|
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,247,117 B2 | 1/2016 | Jacques |
| 9,253,380 B2 | 2/2016 | Venkataraman et al. |
| 9,253,397 B2 | 2/2016 | Lee et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |
| 9,374,512 B2 | 6/2016 | Venkataraman et al. |
| 9,412,206 B2 | 8/2016 | McMahon et al. |
| 9,413,953 B2 | 8/2016 | Maeda |
| 9,426,343 B2 | 8/2016 | Rodda et al. |
| 9,426,361 B2 | 8/2016 | Venkataraman et al. |
| 9,438,888 B2 | 9/2016 | Venkataraman et al. |
| 9,445,003 B1 | 9/2016 | Lelescu et al. |
| 9,456,134 B2 | 9/2016 | Venkataraman et al. |
| 9,456,196 B2 | 9/2016 | Kim et al. |
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 9,576,369 B2 | 2/2017 | Venkataraman et al. |
| 9,578,237 B2 | 2/2017 | Duparre et al. |
| 9,578,259 B2 | 2/2017 | Molina |
| 9,602,805 B2 | 3/2017 | Venkataraman et al. |
| 9,633,442 B2 | 4/2017 | Venkataraman et al. |
| 9,635,274 B2 | 4/2017 | Lin et al. |
| 9,638,883 B1 | 5/2017 | Duparre |
| 9,661,310 B2 | 5/2017 | Deng et al. |
| 9,706,132 B2 | 7/2017 | Nisenzon et al. |
| 9,712,759 B2 | 7/2017 | Venkataraman et al. |
| 9,729,865 B1 | 8/2017 | Kuo et al. |
| 9,733,486 B2 | 8/2017 | Lelescu et al. |
| 9,741,118 B2 | 8/2017 | Mullis |
| 9,743,051 B2 | 8/2017 | Venkataraman et al. |
| 9,749,547 B2 | 8/2017 | Venkataraman et al. |
| 9,749,568 B2 | 8/2017 | McMahon |
| 9,754,422 B2 | 9/2017 | McMahon et al. |
| 9,766,380 B2 | 9/2017 | Duparre et al. |
| 9,769,365 B1 | 9/2017 | Jannard |
| 9,774,789 B2 | 9/2017 | Ciurea et al. |
| 9,774,831 B2 | 9/2017 | Venkataraman et al. |
| 9,787,911 B2 | 10/2017 | McMahon et al. |
| 9,794,476 B2 | 10/2017 | Nayar et al. |
| 9,800,856 B2 | 10/2017 | Venkataraman et al. |
| 9,800,859 B2 | 10/2017 | Venkataraman et al. |
| 9,807,382 B2 | 10/2017 | Duparre et al. |
| 9,811,753 B2 | 11/2017 | Venkataraman et al. |
| 9,813,616 B2 | 11/2017 | Lelescu et al. |
| 9,813,617 B2 | 11/2017 | Venkataraman et al. |
| 9,826,212 B2 | 11/2017 | Newton et al. |
| 9,858,673 B2 | 1/2018 | Ciurea et al. |
| 9,864,921 B2 | 1/2018 | Venkataraman et al. |
| 9,866,739 B2 | 1/2018 | McMahon |
| 9,888,194 B2 | 2/2018 | Duparre |
| 9,892,522 B2 | 2/2018 | Smirnov et al. |
| 9,898,856 B2 | 2/2018 | Yang et al. |
| 9,917,998 B2 | 3/2018 | Venkataraman et al. |
| 9,924,092 B2 | 3/2018 | Rodda et al. |
| 9,936,148 B2 | 4/2018 | McMahon |
| 9,942,474 B2 | 4/2018 | Venkataraman et al. |
| 9,955,070 B2 | 4/2018 | Lelescu et al. |
| 9,986,224 B2 | 5/2018 | Mullis |
| 10,009,538 B2 | 6/2018 | Venkataraman et al. |
| 10,019,816 B2 | 7/2018 | Venkataraman et al. |
| 10,027,901 B2 | 7/2018 | Venkataraman et al. |
| 10,089,740 B2 | 10/2018 | Srikanth et al. |
| 10,091,405 B2 | 10/2018 | Molina |
| 10,119,808 B2 | 11/2018 | Venkataraman et al. |
| 10,122,993 B2 | 11/2018 | Venkataraman et al. |
| 10,127,682 B2 | 11/2018 | Mullis |
| 10,142,560 B2 | 11/2018 | Venkataraman et al. |
| 10,182,216 B2 | 1/2019 | Mullis et al. |
| 10,218,889 B2 | 2/2019 | McMahan |
| 10,225,543 B2 | 3/2019 | Mullis |
| 10,250,871 B2 | 4/2019 | Ciurea et al. |
| 10,261,219 B2 | 4/2019 | Duparre et al. |
| 10,275,676 B2 | 4/2019 | Venkataraman et al. |
| 10,306,120 B2 | 5/2019 | Duparre |
| 10,311,649 B2 | 6/2019 | McMohan et al. |
| 10,334,241 B2 | 6/2019 | Duparre et al. |
| 10,366,472 B2 | 7/2019 | Lelescu et al. |
| 10,375,302 B2 | 8/2019 | Nayar et al. |
| 10,375,319 B2 | 8/2019 | Venkataraman et al. |
| 10,380,752 B2 | 8/2019 | Ciurea et al. |
| 10,390,005 B2 | 8/2019 | Nisenzon et al. |
| 10,412,314 B2 | 9/2019 | McMahon et al. |
| 10,430,682 B2 | 10/2019 | Venkataraman et al. |
| 10,455,168 B2 | 10/2019 | McMahon |
| 10,455,218 B2 | 10/2019 | Venkataraman et al. |
| 10,462,362 B2 | 10/2019 | Lelescu et al. |
| 10,482,618 B2 | 11/2019 | Jain et al. |
| 10,540,806 B2 | 1/2020 | Yang et al. |
| 10,542,208 B2 | 1/2020 | Lelescu et al. |
| 10,547,772 B2 | 1/2020 | Molina |
| 10,560,684 B2 | 2/2020 | Mullis |
| 10,574,905 B2 | 2/2020 | Srikanth et al. |
| 10,638,099 B2 | 4/2020 | Mullis et al. |
| 10,643,383 B2 | 5/2020 | Venkataraman |
| 10,674,138 B2 | 6/2020 | Venkataraman et al. |
| 10,694,114 B2 | 6/2020 | Venkataraman et al. |
| 10,708,492 B2 | 7/2020 | Venkataraman et al. |
| 10,735,635 B2 | 8/2020 | Duparre |
| 10,742,861 B2 | 8/2020 | McMahon |
| 10,767,981 B2 | 9/2020 | Venkataraman et al. |
| 10,805,589 B2 | 10/2020 | Venkataraman et al. |
| 10,818,026 B2 | 10/2020 | Jain et al. |
| 10,839,485 B2 | 11/2020 | Lelescu et al. |
| 10,909,707 B2 | 2/2021 | Ciurea et al. |
| 10,944,961 B2 | 3/2021 | Ciurea et al. |
| 10,958,892 B2 | 3/2021 | Mullis |
| 10,984,276 B2 | 4/2021 | Venkataraman et al. |
| 11,022,725 B2 | 6/2021 | Duparre et al. |
| 11,024,046 B2 | 6/2021 | Venkataraman |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0003669 A1 | 1/2002 | Kedar et al. |
| 2002/0012056 A1 | 1/2002 | Trevino et al. |
| 2002/0015536 A1 | 2/2002 | Warren et al. |
| 2002/0027608 A1 | 3/2002 | Johnson et al. |
| 2002/0028014 A1 | 3/2002 | Ono |
| 2002/0039438 A1 | 4/2002 | Mori et al. |
| 2002/0057845 A1 | 5/2002 | Fossum et al. |
| 2002/0061131 A1 | 5/2002 | Sawhney et al. |
| 2002/0063807 A1 | 5/2002 | Margulis |
| 2002/0075450 A1 | 6/2002 | Aratani et al. |
| 2002/0087403 A1 | 7/2002 | Meyers et al. |
| 2002/0089596 A1 | 7/2002 | Yasuo |
| 2002/0094027 A1 | 7/2002 | Sato et al. |
| 2002/0101528 A1 | 8/2002 | Lee et al. |
| 2002/0113867 A1 | 8/2002 | Takigawa et al. |
| 2002/0113888 A1 | 8/2002 | Sonoda et al. |
| 2002/0118113 A1 | 8/2002 | Oku et al. |
| 2002/0118893 A1 | 8/2002 | Nguyen et al. |
| 2002/0120634 A1 | 8/2002 | Min et al. |
| 2002/0122113 A1 | 9/2002 | Foote |
| 2002/0163054 A1 | 11/2002 | Suda |
| 2002/0167537 A1 | 11/2002 | Trajkovic |
| 2002/0171666 A1 | 11/2002 | Endo et al. |
| 2002/0177054 A1 | 11/2002 | Saitoh et al. |
| 2002/0190991 A1 | 12/2002 | Efran et al. |

(56) References Cited

U.S. PATENT DOCUMENTS

| | | |
|---|---|---|
| 2002/0195548 A1 | 12/2002 | Dowski, Jr. et al. |
| 2003/0025227 A1 | 2/2003 | Daniell |
| 2003/0026474 A1 | 2/2003 | Yano |
| 2003/0086079 A1 | 5/2003 | Barth et al. |
| 2003/0095696 A1 | 5/2003 | Reeves et al. |
| 2003/0124763 A1 | 7/2003 | Fan et al. |
| 2003/0140347 A1 | 7/2003 | Varsa |
| 2003/0156189 A1 | 8/2003 | Utsumi et al. |
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng |
| 2003/0211405 A1 | 11/2003 | Venkataraman |
| 2003/0231179 A1 | 12/2003 | Suzuki |
| 2004/0003409 A1 | 1/2004 | Berstis |
| 2004/0008271 A1 | 1/2004 | Hagimori et al. |
| 2004/0012689 A1 | 1/2004 | Tinnerino et al. |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0075654 A1 | 4/2004 | Hsiao et al. |
| 2004/0096119 A1 | 5/2004 | Williams et al. |
| 2004/0100570 A1 | 5/2004 | Shizukuishi |
| 2004/0105021 A1 | 6/2004 | Hu |
| 2004/0114807 A1 | 6/2004 | Lelescu et al. |
| 2004/0141659 A1 | 7/2004 | Zhang |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski et al. |
| 2004/0196379 A1 | 10/2004 | Chen et al. |
| 2004/0207600 A1 | 10/2004 | Zhang et al. |
| 2004/0207836 A1 | 10/2004 | Chhibber et al. |
| 2004/0212734 A1 | 10/2004 | Macinnis et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239782 A1 | 12/2004 | Equitz et al. |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0083531 A1 | 4/2005 | Millerd et al. |
| 2005/0084179 A1 | 4/2005 | Hanna et al. |
| 2005/0111705 A1 | 5/2005 | Waupotitsch et al. |
| 2005/0117015 A1 | 6/2005 | Cutler |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder et al. |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0168924 A1 | 8/2005 | Wu et al. |
| 2005/0175257 A1 | 8/2005 | Kuroki |
| 2005/0185711 A1 | 8/2005 | Pfister et al. |
| 2005/0203380 A1 | 9/2005 | Sauer et al. |
| 2005/0205785 A1 | 9/2005 | Hornback et al. |
| 2005/0219264 A1 | 10/2005 | Shum et al. |
| 2005/0219363 A1 | 10/2005 | Kohler et al. |
| 2005/0224843 A1 | 10/2005 | Boemler |
| 2005/0225654 A1 | 10/2005 | Feldman et al. |
| 2005/0265633 A1 | 12/2005 | Piacentino et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0013318 A1 | 1/2006 | Webb et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029270 A1 | 2/2006 | Berestov et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1 | 2/2006 | Rother et al. |
| 2006/0046204 A1 | 3/2006 | Ono et al. |
| 2006/0049930 A1 | 3/2006 | Zruya et al. |
| 2006/0050980 A1 | 3/2006 | Kohashi et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0119597 A1 | 6/2006 | Oshino |
| 2006/0125936 A1 | 6/2006 | Gruhike et al. |
| 2006/0138322 A1 | 6/2006 | Costello et al. |
| 2006/0139475 A1 | 6/2006 | Esch et al. |
| 2006/0152803 A1 | 7/2006 | Provitola |
| 2006/0153290 A1 | 7/2006 | Watabe et al. |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187322 A1 | 8/2006 | Janson, Jr. et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |
| 2006/0210146 A1 | 9/2006 | Gu |
| 2006/0210186 A1 | 9/2006 | Berkner |
| 2006/0214085 A1 | 9/2006 | Olsen et al. |
| 2006/0215924 A1 | 9/2006 | Steinberg et al. |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen et al. |
| 2007/0008575 A1 | 1/2007 | Yu et al. |
| 2007/0009150 A1 | 1/2007 | Suwa |
| 2007/0024614 A1 | 2/2007 | Tam et al. |
| 2007/0030356 A1 | 2/2007 | Yea et al. |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0116447 A1 | 5/2007 | Ye |
| 2007/0126898 A1 | 6/2007 | Feldman et al. |
| 2007/0127831 A1 | 6/2007 | Venkataraman |
| 2007/0139333 A1 | 6/2007 | Sato et al. |

(56) References Cited

U.S. PATENT DOCUMENTS

| | | |
|---|---|---|
| 2007/0140685 A1 | 6/2007 | Wu |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0166447 A1 | 7/2007 | Ur-Rehman et al. |
| 2007/0171290 A1 | 7/2007 | Kroger |
| 2007/0177004 A1 | 8/2007 | Kolehmainen et al. |
| 2007/0182843 A1 | 8/2007 | Shimamura et al. |
| 2007/0201859 A1 | 8/2007 | Sarrat |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0225600 A1 | 9/2007 | Weibrecht et al. |
| 2007/0228256 A1 | 10/2007 | Mentzer et al. |
| 2007/0236595 A1 | 10/2007 | Pan et al. |
| 2007/0242141 A1 | 10/2007 | Ciurea |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0291995 A1 | 12/2007 | Rivera |
| 2007/0296721 A1 | 12/2007 | Chang et al. |
| 2007/0296832 A1 | 12/2007 | Ota et al. |
| 2007/0296835 A1 | 12/2007 | Olsen et al. |
| 2007/0296846 A1 | 12/2007 | Barman et al. |
| 2007/0296847 A1 | 12/2007 | Chang et al. |
| 2007/0297696 A1 | 12/2007 | Hamza et al. |
| 2008/0006859 A1 | 1/2008 | Mionetto |
| 2008/0019611 A1 | 1/2008 | Larkin et al. |
| 2008/0024683 A1 | 1/2008 | Damera-Venkata et al. |
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0044170 A1 | 2/2008 | Yap et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi |
| 2008/0112059 A1 | 5/2008 | Choi et al. |
| 2008/0112635 A1 | 5/2008 | Kondo et al. |
| 2008/0117289 A1 | 5/2008 | Schowengerdt et al. |
| 2008/0118241 A1 | 5/2008 | TeKolste et al. |
| 2008/0131019 A1 | 6/2008 | Ng |
| 2008/0131107 A1 | 6/2008 | Ueno |
| 2008/0144972 A1 | 6/2008 | Kang et al. |
| 2008/0151097 A1 | 6/2008 | Chen et al. |
| 2008/0152213 A1 | 6/2008 | Medioni et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0208506 A1 | 8/2008 | Kuwata |
| 2008/0211737 A1 | 9/2008 | Kim et al. |
| 2008/0218610 A1 | 9/2008 | Chapman et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0246866 A1 | 10/2008 | Kinoshita et al. |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0066693 A1 | 3/2009 | Carson |
| 2009/0079862 A1 | 3/2009 | Subbotin |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0092363 A1 | 4/2009 | Daum et al. |
| 2009/0096050 A1 | 4/2009 | Park |
| 2009/0102956 A1 | 4/2009 | Georgiev |
| 2009/0103792 A1 | 4/2009 | Rahn et al. |
| 2009/0109306 A1 | 4/2009 | Shan et al. |
| 2009/0127430 A1 | 5/2009 | Hirasawa et al. |
| 2009/0128644 A1 | 5/2009 | Camp, Jr. et al. |
| 2009/0128833 A1 | 5/2009 | Yahav |
| 2009/0129667 A1 | 5/2009 | Ho et al. |
| 2009/0140131 A1 | 6/2009 | Utagawa |
| 2009/0141933 A1 | 6/2009 | Wagg |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0167923 A1 | 7/2009 | Safaee-Rad et al. |
| 2009/0167934 A1 | 7/2009 | Gupta |
| 2009/0175349 A1 | 7/2009 | Ye et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0245637 A1 | 10/2009 | Barman et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone et al. |
| 2009/0273663 A1 | 11/2009 | Yoshida |
| 2009/0274387 A1 | 11/2009 | Jin |
| 2009/0279800 A1 | 11/2009 | Uetani et al. |
| 2009/0284651 A1 | 11/2009 | Srinivasan |
| 2009/0290811 A1 | 11/2009 | Imai |
| 2009/0297056 A1 | 12/2009 | Lelescu et al. |
| 2009/0302205 A9 | 12/2009 | Olsen et al. |
| 2009/0317061 A1 | 12/2009 | Jung et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang |
| 2010/0045809 A1 | 2/2010 | Packard |
| 2010/0053342 A1 | 3/2010 | Hwang et al. |
| 2010/0053347 A1 | 3/2010 | Agarwala et al. |

(56) References Cited

U.S. PATENT DOCUMENTS

| | | |
|---|---|---|
| 2010/0053415 A1 | 3/2010 | Yun |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085351 A1 | 4/2010 | Deb et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097444 A1 | 4/2010 | Lablans |
| 2010/0097491 A1 | 4/2010 | Farina et al. |
| 2010/0103175 A1 | 4/2010 | Okutomi et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0128145 A1 | 5/2010 | Pitts et al. |
| 2010/0129048 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142828 A1 | 6/2010 | Chang et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |
| 2010/0171866 A1 | 7/2010 | Brady et al. |
| 2010/0177411 A1 | 7/2010 | Hegde et al. |
| 2010/0182406 A1 | 7/2010 | Benitez |
| 2010/0194860 A1 | 8/2010 | Mentz et al. |
| 2010/0194901 A1 | 8/2010 | van Hoorebeke et al. |
| 2010/0195716 A1 | 8/2010 | Klein Gunnewiek et al. |
| 2010/0201809 A1 | 8/2010 | Oyama et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0214423 A1 | 8/2010 | Ogawa |
| 2010/0220212 A1 | 9/2010 | Perlman et al. |
| 2010/0223237 A1 | 9/2010 | Mishra et al. |
| 2010/0225740 A1 | 9/2010 | Jung et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0245684 A1 | 9/2010 | Xiao et al. |
| 2010/0254627 A1 | 10/2010 | Tehran et al. |
| 2010/0259610 A1 | 10/2010 | Petersen |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0277629 A1 | 11/2010 | Tanaka |
| 2010/0281070 A1 | 11/2010 | Chan et al. |
| 2010/0289941 A1 | 11/2010 | Ito et al. |
| 2010/0290483 A1 | 11/2010 | Park et al. |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu |
| 2010/0321640 A1 | 12/2010 | Yeh et al. |
| 2010/0329556 A1 | 12/2010 | Mitarai et al. |
| 2010/0329582 A1 | 12/2010 | Albu et al. |
| 2011/0001037 A1 | 1/2011 | Tewinkle |
| 2011/0013006 A1 | 1/2011 | Uzenbajakava et al. |
| 2011/0018973 A1 | 1/2011 | Takayama |
| 2011/0019048 A1 | 1/2011 | Raynor et al. |
| 2011/0019243 A1 | 1/2011 | Constant, Jr. et al. |
| 2011/0031381 A1 | 2/2011 | Tay et al. |
| 2011/0032341 A1 | 2/2011 | Ignatov et al. |
| 2011/0032370 A1 | 2/2011 | Ludwig |
| 2011/0033129 A1 | 2/2011 | Robinson |
| 2011/0038536 A1 | 2/2011 | Gong |
| 2011/0043604 A1 | 2/2011 | Peleg et al. |
| 2011/0043613 A1 | 2/2011 | Rohaly et al. |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0063285 A1* | 3/2011 | Hoover ................ G06T 15/005 345/419 |
| 2011/0064327 A1 | 3/2011 | Dagher et al. |
| 2011/0069189 A1 | 3/2011 | Venkataraman et al. |
| 2011/0080487 A1 | 4/2011 | Venkataraman et al. |
| 2011/0084893 A1 | 4/2011 | Lee et al. |
| 2011/0085028 A1 | 4/2011 | Samadani et al. |
| 2011/0090217 A1 | 4/2011 | Mashitani et al. |
| 2011/0102553 A1 | 5/2011 | Corcoran et al. |
| 2011/0108708 A1 | 5/2011 | Olsen et al. |
| 2011/0115886 A1 | 5/2011 | Nguyen et al. |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0141309 A1 | 6/2011 | Nagashima et al. |
| 2011/0142138 A1 | 6/2011 | Tian et al. |
| 2011/0149408 A1 | 6/2011 | Hahgholt et al. |
| 2011/0149409 A1 | 6/2011 | Haugholt et al. |
| 2011/0150321 A1 | 6/2011 | Cheong et al. |
| 2011/0153248 A1 | 6/2011 | Gu et al. |
| 2011/0157321 A1 | 6/2011 | Nakajima et al. |
| 2011/0157451 A1 | 6/2011 | Chang |
| 2011/0169923 A1* | 7/2011 | Dellaert ................ G06T 7/285 901/1 |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0193944 A1 | 8/2011 | Lian et al. |
| 2011/0199458 A1 | 8/2011 | Hayasaka et al. |
| 2011/0200319 A1 | 8/2011 | Kravitz et al. |
| 2011/0206291 A1 | 8/2011 | Kashani et al. |
| 2011/0207074 A1 | 8/2011 | Hall-Holt et al. |
| 2011/0211068 A1 | 9/2011 | Yokota |
| 2011/0211077 A1 | 9/2011 | Nayar et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra et al. |
| 2011/0222757 A1 | 9/2011 | Yeatman, Jr. et al. |
| 2011/0228142 A1 | 9/2011 | Brueckner et al. |
| 2011/0228144 A1 | 9/2011 | Tian et al. |
| 2011/0234825 A1 | 9/2011 | Liu et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0243428 A1 | 10/2011 | Das Gupta et al. |
| 2011/0255592 A1 | 10/2011 | Sung et al. |
| 2011/0255745 A1 | 10/2011 | Hodder et al. |
| 2011/0255786 A1 | 10/2011 | Hunter et al. |
| 2011/0261993 A1 | 10/2011 | Weiming et al. |
| 2011/0267264 A1 | 11/2011 | Mccarthy et al. |
| 2011/0267348 A1 | 11/2011 | Lin et al. |
| 2011/0273442 A1 | 11/2011 | Drost et al. |
| 2011/0273531 A1 | 11/2011 | Ito et al. |
| 2011/0274175 A1 | 11/2011 | Sumitomo |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285701 A1 | 11/2011 | Chen et al. |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298898 A1 | 12/2011 | Jung et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim et al. |
| 2012/0012748 A1 | 1/2012 | Pain |
| 2012/0013748 A1 | 1/2012 | Stanwood et al. |

(56) References Cited

U.S. PATENT DOCUMENTS

| | | |
|---|---|---|
| 2012/0014456 A1 | 1/2012 | Martinez Bauza et al. |
| 2012/0019530 A1 | 1/2012 | Baker |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0026478 A1 | 2/2012 | Chen et al. |
| 2012/0038745 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0051624 A1 | 3/2012 | Ando |
| 2012/0056982 A1 | 3/2012 | Katz et al. |
| 2012/0057040 A1 | 3/2012 | Park et al. |
| 2012/0062697 A1 | 3/2012 | Treado et al. |
| 2012/0062702 A1 | 3/2012 | Jiang et al. |
| 2012/0062756 A1 | 3/2012 | Tian et al. |
| 2012/0069235 A1 | 3/2012 | Imai |
| 2012/0081519 A1 | 4/2012 | Goma et al. |
| 2012/0086803 A1 | 4/2012 | Malzbender et al. |
| 2012/0105590 A1 | 5/2012 | Fukumoto et al. |
| 2012/0105654 A1 | 5/2012 | Kwatra et al. |
| 2012/0105691 A1 | 5/2012 | Waqas et al. |
| 2012/0113232 A1 | 5/2012 | Joblove |
| 2012/0113318 A1 | 5/2012 | Galstian et al. |
| 2012/0113413 A1 | 5/2012 | Miahczylowicz-Wolski et al. |
| 2012/0114224 A1 | 5/2012 | Xu et al. |
| 2012/0114260 A1 | 5/2012 | Takahashi et al. |
| 2012/0120264 A1 | 5/2012 | Lee et al. |
| 2012/0127275 A1 | 5/2012 | Von Zitzewitz et al. |
| 2012/0127284 A1 | 5/2012 | Bar-Zeev et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0162374 A1 | 6/2012 | Markas et al. |
| 2012/0163672 A1 | 6/2012 | McKinnon |
| 2012/0163725 A1 | 6/2012 | Fukuhara |
| 2012/0169433 A1 | 7/2012 | Mullins et al. |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0188235 A1 | 7/2012 | Wu et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai et al. |
| 2012/0200726 A1 | 8/2012 | Bugnariu |
| 2012/0200734 A1 | 8/2012 | Tang |
| 2012/0206582 A1 | 8/2012 | DiCarlo et al. |
| 2012/0218455 A1 | 8/2012 | Imai et al. |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0250990 A1 | 10/2012 | Bocirnea |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0274626 A1 | 11/2012 | Hsieh |
| 2012/0287291 A1 | 11/2012 | McMahon |
| 2012/0290257 A1 | 11/2012 | Hodge et al. |
| 2012/0293489 A1 | 11/2012 | Chen et al. |
| 2012/0293624 A1 | 11/2012 | Chen et al. |
| 2012/0293695 A1 | 11/2012 | Tanaka |
| 2012/0307084 A1 | 12/2012 | Mantzel |
| 2012/0307093 A1 | 12/2012 | Miyoshi |
| 2012/0307099 A1 | 12/2012 | Yahata |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0002953 A1 | 1/2013 | Noguchi et al. |
| 2013/0003184 A1 | 1/2013 | Duparre |
| 2013/0010073 A1 | 1/2013 | Do et al. |
| 2013/0016245 A1 | 1/2013 | Yuba |
| 2013/0016885 A1 | 1/2013 | Tsujimoto |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0047396 A1 | 2/2013 | Au et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee et al. |
| 2013/0076967 A1 | 3/2013 | Brunner et al. |
| 2013/0077859 A1 | 3/2013 | Stauder et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0093852 A1* | 4/2013 | Ye .................. A61H 3/068 348/46 |
| 2013/0100254 A1 | 4/2013 | Morioka et al. |
| 2013/0107061 A1 | 5/2013 | Kumar et al. |
| 2013/0113888 A1 | 5/2013 | Koguchi |
| 2013/0113899 A1 | 5/2013 | Morohoshi et al. |
| 2013/0113939 A1 | 5/2013 | Strandemar |
| 2013/0120536 A1 | 5/2013 | Song et al. |
| 2013/0120605 A1 | 5/2013 | Georgiev et al. |
| 2013/0121559 A1 | 5/2013 | Hu et al. |
| 2013/0127988 A1 | 5/2013 | Wang et al. |
| 2013/0128049 A1 | 5/2013 | Schofield et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0135315 A1 | 5/2013 | Bares et al. |
| 2013/0135448 A1 | 5/2013 | Nagumo et al. |
| 2013/0147979 A1 | 6/2013 | McMahon et al. |
| 2013/0155050 A1 | 6/2013 | Rastogi et al. |
| 2013/0156262 A1 | 6/2013 | Taguchi et al. |
| 2013/0162641 A1 | 6/2013 | Zhang et al. |
| 2013/0169754 A1 | 7/2013 | Aronsson et al. |
| 2013/0176394 A1 | 7/2013 | Tian et al. |
| 2013/0208138 A1 | 8/2013 | Li et al. |
| 2013/0215108 A1 | 8/2013 | McMahon et al. |
| 2013/0215231 A1 | 8/2013 | Hiramoto et al. |
| 2013/0216144 A1 | 8/2013 | Robinson et al. |
| 2013/0222556 A1 | 8/2013 | Shimada |
| 2013/0222656 A1 | 8/2013 | Kaneko |
| 2013/0223759 A1 | 8/2013 | Nishiyama |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone et al. |
| 2013/0258067 A1 | 10/2013 | Zhang et al. |
| 2013/0259317 A1 | 10/2013 | Gaddy |
| 2013/0265459 A1 | 10/2013 | Duparre et al. |
| 2013/0274596 A1 | 10/2013 | Azizian et al. |
| 2013/0274923 A1 | 10/2013 | By |
| 2013/0278631 A1 | 10/2013 | Border et al. |
| 2013/0286236 A1 | 10/2013 | Mankowski |
| 2013/0293760 A1 | 11/2013 | Nisenzon et al. |
| 2013/0308197 A1 | 11/2013 | Duparre |
| 2013/0321581 A1 | 12/2013 | El-ghoroury et al. |
| 2013/0321589 A1 | 12/2013 | Kirk et al. |
| 2013/0335598 A1 | 12/2013 | Gustavsson et al. |
| 2013/0342641 A1 | 12/2013 | Morioka et al. |
| 2014/0002674 A1 | 1/2014 | Duparre et al. |

(56) References Cited

U.S. PATENT DOCUMENTS

| | | |
|---|---|---|
| 2014/0002675 A1 | 1/2014 | Duparre et al. |
| 2014/0009586 A1 | 1/2014 | McNamer et al. |
| 2014/0013273 A1 | 1/2014 | Ng |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0059462 A1 | 2/2014 | Wernersson |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0081454 A1 | 3/2014 | Nuyujukian et al. |
| 2014/0085502 A1 | 3/2014 | Lin et al. |
| 2014/0092281 A1 | 4/2014 | Nisenzon et al. |
| 2014/0098266 A1 | 4/2014 | Nayar et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0125760 A1 | 5/2014 | Au et al. |
| 2014/0125771 A1 | 5/2014 | Grossmann et al. |
| 2014/0132810 A1 | 5/2014 | McMahon |
| 2014/0139642 A1 | 5/2014 | Ni et al. |
| 2014/0139643 A1 | 5/2014 | Hogasten et al. |
| 2014/0140626 A1 | 5/2014 | Cho et al. |
| 2014/0146132 A1 | 5/2014 | Bagnato et al. |
| 2014/0146201 A1 | 5/2014 | Knight et al. |
| 2014/0176592 A1 | 6/2014 | Wilburn et al. |
| 2014/0183258 A1 | 7/2014 | DiMuro |
| 2014/0183334 A1 | 7/2014 | Wang et al. |
| 2014/0186045 A1 | 7/2014 | Poddar et al. |
| 2014/0192154 A1 | 7/2014 | Jeong et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267829 A1 | 9/2014 | McMahon et al. |
| 2014/0267890 A1 | 9/2014 | Lelescu et al. |
| 2014/0285675 A1 | 9/2014 | Mullis |
| 2014/0300706 A1 | 10/2014 | Song |
| 2014/0307058 A1 | 10/2014 | Kirk et al. |
| 2014/0307063 A1 | 10/2014 | Lee |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0016712 A1 | 1/2015 | Rhoads et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042814 A1 | 2/2015 | Vaziri |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085073 A1 | 3/2015 | Bruls et al. |
| 2015/0085174 A1 | 3/2015 | Shabtay et al. |
| 2015/0091900 A1 | 4/2015 | Yang et al. |
| 2015/0095235 A1 | 4/2015 | Dua |
| 2015/0098079 A1 | 4/2015 | Montgomery et al. |
| 2015/0104076 A1 | 4/2015 | Hayasaka |
| 2015/0104101 A1 | 4/2015 | Bryant et al. |
| 2015/0122411 A1 | 5/2015 | Rodda et al. |
| 2015/0124059 A1 | 5/2015 | Georgiev et al. |
| 2015/0124113 A1 | 5/2015 | Rodda et al. |
| 2015/0124151 A1 | 5/2015 | Rodda et al. |
| 2015/0138346 A1 | 5/2015 | Venkataraman et al. |
| 2015/0146029 A1 | 5/2015 | Venkataraman et al. |
| 2015/0146030 A1 | 5/2015 | Venkataraman et al. |
| 2015/0161798 A1 | 6/2015 | Venkataraman et al. |
| 2015/0199793 A1 | 7/2015 | Venkataraman et al. |
| 2015/0199841 A1 | 7/2015 | Venkataraman et al. |
| 2015/0207990 A1 | 7/2015 | Ford et al. |
| 2015/0228081 A1 | 8/2015 | Kim et al. |
| 2015/0235476 A1 | 8/2015 | McMahon et al. |
| 2015/0237329 A1 | 8/2015 | Venkataraman et al. |
| 2015/0243480 A1 | 8/2015 | Yamada |
| 2015/0244927 A1 | 8/2015 | Laroia et al. |
| 2015/0245013 A1 | 8/2015 | Venkataraman et al. |
| 2015/0248744 A1 | 9/2015 | Hayasaka et al. |
| 2015/0254868 A1 | 9/2015 | Srikanth et al. |
| 2015/0264337 A1 | 9/2015 | Venkataraman et al. |
| 2015/0288861 A1 | 10/2015 | Duparre |
| 2015/0296137 A1 | 10/2015 | Duparre et al. |
| 2015/0312455 A1 | 10/2015 | Venkataraman et al. |
| 2015/0317638 A1 | 11/2015 | Donaldson |
| 2015/0326852 A1 | 11/2015 | Duparre et al. |
| 2015/0332468 A1 | 11/2015 | Hayasaka et al. |
| 2015/0373261 A1 | 12/2015 | Rodda et al. |
| 2016/0037097 A1 | 2/2016 | Duparre |
| 2016/0042548 A1 | 2/2016 | Du et al. |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0065934 A1 | 3/2016 | Kaza et al. |
| 2016/0163051 A1 | 6/2016 | Mullis |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0182786 A1 | 6/2016 | Anderson et al. |
| 2016/0191768 A1 | 6/2016 | Shin et al. |
| 2016/0195733 A1 | 7/2016 | Lelescu et al. |
| 2016/0198096 A1 | 7/2016 | McMahon et al. |
| 2016/0209654 A1 | 7/2016 | Riccomini et al. |
| 2016/0210785 A1 | 7/2016 | Balachandreswaran et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0266284 A1 | 9/2016 | Duparre et al. |
| 2016/0267486 A1 | 9/2016 | Mitra et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |

(56) References Cited

U.S. PATENT DOCUMENTS

| | | |
|---|---|---|
| 2016/0269664 A1 | 9/2016 | Duparre |
| 2016/0309084 A1 | 10/2016 | Venkataraman et al. |
| 2016/0309134 A1 | 10/2016 | Venkataraman et al. |
| 2016/0316140 A1 | 10/2016 | Nayar et al. |
| 2016/0323578 A1 | 11/2016 | Kaneko et al. |
| 2016/0335486 A1 | 11/2016 | Fleishman et al. |
| 2017/0004791 A1 | 1/2017 | Aubineau et al. |
| 2017/0006233 A1 | 1/2017 | Venkataraman et al. |
| 2017/0011405 A1 | 1/2017 | Pandey |
| 2017/0048468 A1 | 2/2017 | Pain et al. |
| 2017/0053382 A1 | 2/2017 | Lelescu et al. |
| 2017/0054901 A1 | 2/2017 | Venkataraman et al. |
| 2017/0070672 A1 | 3/2017 | Rodda et al. |
| 2017/0070673 A1 | 3/2017 | Lelescu et al. |
| 2017/0070753 A1 | 3/2017 | Kaneko |
| 2017/0078568 A1 | 3/2017 | Venkataraman et al. |
| 2017/0085845 A1 | 3/2017 | Venkataraman et al. |
| 2017/0094243 A1 | 3/2017 | Venkataraman et al. |
| 2017/0099465 A1 | 4/2017 | Mullis et al. |
| 2017/0109742 A1 | 4/2017 | Varadarajan |
| 2017/0132794 A1 | 5/2017 | Lee et al. |
| 2017/0142405 A1 | 5/2017 | Shors et al. |
| 2017/0163862 A1 | 6/2017 | Molina |
| 2017/0178363 A1 | 6/2017 | Venkataraman et al. |
| 2017/0187933 A1 | 6/2017 | Duparre |
| 2017/0188011 A1 | 6/2017 | Panescu et al. |
| 2017/0244960 A1 | 8/2017 | Ciurea et al. |
| 2017/0257562 A1 | 9/2017 | Venkataraman et al. |
| 2017/0365104 A1 | 12/2017 | McMahon et al. |
| 2018/0005244 A1 | 1/2018 | Govindarajan et al. |
| 2018/0007284 A1 | 1/2018 | Venkataraman et al. |
| 2018/0013945 A1 | 1/2018 | Ciurea et al. |
| 2018/0024330 A1 | 1/2018 | Laroia |
| 2018/0035057 A1 | 2/2018 | McMahon et al. |
| 2018/0040135 A1 | 2/2018 | Mullis |
| 2018/0048830 A1 | 2/2018 | Venkataraman et al. |
| 2018/0048879 A1 | 2/2018 | Venkataraman et al. |
| 2018/0081090 A1 | 3/2018 | Duparre et al. |
| 2018/0097993 A1 | 4/2018 | Nayar et al. |
| 2018/0109782 A1 | 4/2018 | Duparre et al. |
| 2018/0124311 A1 | 5/2018 | Lelescu et al. |
| 2018/0131852 A1 | 5/2018 | McMahon |
| 2018/0139382 A1 | 5/2018 | Venkataraman et al. |
| 2018/0189767 A1 | 7/2018 | Bigioi |
| 2018/0197035 A1 | 7/2018 | Venkataraman et al. |
| 2018/0211402 A1 | 7/2018 | Ciurea et al. |
| 2018/0227511 A1 | 8/2018 | McMahon |
| 2018/0240265 A1 | 8/2018 | Yang et al. |
| 2018/0270473 A1 | 9/2018 | Mullis |
| 2018/0286120 A1 | 10/2018 | Fleishman et al. |
| 2018/0302554 A1 | 10/2018 | Lelescu et al. |
| 2018/0330182 A1 | 11/2018 | Venkataraman et al. |
| 2018/0376122 A1 | 12/2018 | Park et al. |
| 2019/0012768 A1 | 1/2019 | Tafazoli Bilandi et al. |
| 2019/0037116 A1 | 1/2019 | Molina |
| 2019/0037150 A1 | 1/2019 | Srikanth et al. |
| 2019/0043253 A1 | 2/2019 | Lucas et al. |
| 2019/0045213 A1* | 2/2019 | Raut ............ H04N 19/573 |
| 2019/0057513 A1 | 2/2019 | Jain et al. |
| 2019/0063905 A1 | 2/2019 | Venkataraman et al. |
| 2019/0089947 A1 | 3/2019 | Venkataraman et al. |
| 2019/0098209 A1 | 3/2019 | Venkataraman et al. |
| 2019/0109998 A1 | 4/2019 | Venkataraman et al. |
| 2019/0164341 A1 | 5/2019 | Venkataraman |
| 2019/0174040 A1 | 6/2019 | Mcmahon |
| 2019/0197735 A1 | 6/2019 | Xiong et al. |
| 2019/0215496 A1 | 7/2019 | Mullis et al. |
| 2019/0230348 A1 | 7/2019 | Ciurea et al. |
| 2019/0235138 A1 | 8/2019 | Duparre et al. |
| 2019/0243086 A1 | 8/2019 | Rodda et al. |
| 2019/0244379 A1 | 8/2019 | Venkataraman |
| 2019/0268586 A1 | 8/2019 | Mullis |
| 2019/0289176 A1 | 9/2019 | Duparre |
| 2019/0347768 A1 | 11/2019 | Lelescu et al. |
| 2019/0356863 A1 | 11/2019 | Venkataraman et al. |
| 2019/0362515 A1 | 11/2019 | Ciurea et al. |
| 2019/0364263 A1 | 11/2019 | Jannard et al. |
| 2020/0026948 A1 | 1/2020 | Venkataraman et al. |
| 2020/0151894 A1 | 5/2020 | Jain et al. |
| 2020/0252597 A1 | 8/2020 | Mullis |
| 2020/0327692 A1 | 10/2020 | Lin et al. |
| 2020/0334905 A1 | 10/2020 | Venkataraman |
| 2020/0353878 A1 | 11/2020 | Briggs |
| 2020/0389604 A1 | 12/2020 | Venkataraman et al. |
| 2021/0042952 A1 | 2/2021 | Jain et al. |
| 2021/0044790 A1 | 2/2021 | Venkataraman et al. |
| 2021/0063141 A1 | 3/2021 | Venkataraman et al. |
| 2021/0133927 A1 | 5/2021 | Lelescu et al. |
| 2021/0150748 A1 | 5/2021 | Ciurea et al. |

FOREIGN PATENT DOCUMENTS

| | | |
|---|---|---|
| CN | 1669332 A | 9/2005 |
| CN | 1727991 A | 2/2006 |
| CN | 1839394 A | 9/2006 |
| CN | 1985524 A | 6/2007 |
| CN | 1992499 A | 7/2007 |
| CN | 101010619 A | 8/2007 |
| CN | 101046882 A | 10/2007 |
| CN | 101064780 A | 10/2007 |
| CN | 101102388 A | 1/2008 |
| CN | 101147392 A | 3/2008 |
| CN | 201043890 Y | 4/2008 |
| CN | 101212566 A | 7/2008 |
| CN | 101312540 A | 11/2008 |
| CN | 101427372 A | 5/2009 |
| CN | 101551586 A | 10/2009 |
| CN | 101593350 A | 12/2009 |
| CN | 101606086 A | 12/2009 |
| CN | 101785025 A | 7/2010 |
| CN | 101883291 A | 11/2010 |
| CN | 102037717 A | 4/2011 |
| CN | 102164298 A | 8/2011 |
| CN | 102184720 A | 9/2011 |
| CN | 102375199 A | 3/2012 |
| CN | 103004180 A | 3/2013 |
| CN | 103765864 A | 4/2014 |
| CN | 104081414 A | 10/2014 |
| CN | 104508681 A | 4/2015 |
| CN | 104662589 A | 5/2015 |
| CN | 104685513 A | 6/2015 |
| CN | 104685860 A | 6/2015 |
| CN | 105409212 A | 3/2016 |
| CN | 103765864 B | 7/2017 |
| CN | 104081414 B | 8/2017 |
| CN | 104662589 B | 8/2017 |
| CN | 107077743 A | 8/2017 |
| CN | 107230236 A | 10/2017 |
| CN | 107346061 A | 11/2017 |
| CN | 107404609 A | 11/2017 |
| CN | 104685513 B | 4/2018 |
| CN | 107924572 A | 4/2018 |
| CN | 108307675 A | 7/2018 |
| CN | 104335246 B | 9/2018 |
| CN | 107404609 B | 2/2020 |
| CN | 107346061 B | 4/2020 |
| CN | 107230236 B | 12/2020 |
| CN | 108307675 B | 12/2020 |
| CN | 107077743 B | 3/2021 |
| DE | 602011041799.1 | 9/2017 |
| EP | 0677821 A2 | 10/1995 |
| EP | 0840502 A2 | 5/1998 |
| EP | 1201407 A2 | 5/2002 |
| EP | 1355274 A2 | 10/2003 |
| EP | 1734766 A2 | 12/2006 |
| EP | 1991145 A1 | 11/2008 |
| EP | 1243945 B1 | 1/2009 |
| EP | 2026563 A1 | 2/2009 |
| EP | 2031592 A1 | 3/2009 |
| EP | 2041454 A2 | 4/2009 |
| EP | 2072785 A1 | 6/2009 |
| EP | 2104334 A1 | 9/2009 |
| EP | 2136345 A1 | 12/2009 |
| EP | 2156244 A1 | 2/2010 |

(56) References Cited

FOREIGN PATENT DOCUMENTS

| | | |
|---|---|---|
| EP | 2244484 A1 | 10/2010 |
| EP | 0957642 B1 | 4/2011 |
| EP | 2336816 A2 | 6/2011 |
| EP | 2339532 A1 | 6/2011 |
| EP | 2381418 A1 | 10/2011 |
| EP | 2386554 A1 | 11/2011 |
| EP | 2462477 A1 | 6/2012 |
| EP | 2502115 A2 | 9/2012 |
| EP | 2569935 A1 | 3/2013 |
| EP | 2652678 A1 | 10/2013 |
| EP | 2677066 A1 | 12/2013 |
| EP | 2708019 A1 | 3/2014 |
| EP | 2761534 A1 | 8/2014 |
| EP | 2777245 A1 | 9/2014 |
| EP | 2867718 A1 | 5/2015 |
| EP | 2873028 A1 | 5/2015 |
| EP | 2888698 A2 | 7/2015 |
| EP | 2888720 A1 | 7/2015 |
| EP | 2901671 A2 | 8/2015 |
| EP | 2973476 A1 | 1/2016 |
| EP | 3066690 A1 | 9/2016 |
| EP | 2569935 B1 | 12/2016 |
| EP | 3201877 A1 | 8/2017 |
| EP | 2652678 B1 | 9/2017 |
| EP | 3284061 A1 | 2/2018 |
| EP | 3286914 A1 | 2/2018 |
| EP | 3201877 A4 | 3/2018 |
| EP | 2817955 B1 | 4/2018 |
| EP | 3328048 A1 | 5/2018 |
| EP | 3075140 B1 | 6/2018 |
| EP | 3201877 B1 | 12/2018 |
| EP | 3467776 A1 | 4/2019 |
| EP | 2708019 B1 | 10/2019 |
| EP | 3286914 B1 | 12/2019 |
| EP | 2761534 B1 | 11/2020 |
| EP | 2888720 B1 | 3/2021 |
| EP | 3328048 B1 | 4/2021 |
| GB | 2482022 A | 1/2012 |
| IN | 2708/CHENP/2014 A1 | 8/2015 |
| IN | 361194 | 3/2021 |
| JP | 59-025483 | 2/1984 |
| JP | 64-037177 | 2/1989 |
| JP | 02-285772 A | 11/1990 |
| JP | 06129851 A | 5/1994 |
| JP | 07-015457 A | 1/1995 |
| JP | H0756112 A | 3/1995 |
| JP | 09171075 A | 6/1997 |
| JP | 09181913 A | 7/1997 |
| JP | 10253351 A | 9/1998 |
| JP | 11142609 A | 5/1999 |
| JP | 11223708 A | 8/1999 |
| JP | 11325889 A | 11/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002209226 A | 7/2002 |
| JP | 2002250607 A | 9/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005303694 A | 10/2005 |
| JP | 2005341569 A | 12/2005 |
| JP | 2005354124 A | 12/2005 |
| JP | 2006033228 A | 2/2006 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008172735 A | 7/2008 |
| JP | 2008258885 A | 10/2008 |
| JP | 2009064421 A | 3/2009 |
| JP | 2009132010 A | 6/2009 |
| JP | 2009300268 A | 12/2009 |
| JP | 2010139288 A | 6/2010 |
| JP | 2011017764 A | 1/2011 |
| JP | 2011030184 A | 2/2011 |
| JP | 2011109484 A | 6/2011 |
| JP | 2011523538 A | 8/2011 |
| JP | 2011203238 A | 10/2011 |
| JP | 2012504805 A | 2/2012 |
| JP | 2011052064 A1 | 3/2013 |
| JP | 2013509022 A | 3/2013 |
| JP | 2013526801 A | 6/2013 |
| JP | 2014519741 A | 8/2014 |
| JP | 2014521117 A | 8/2014 |
| JP | 2014535191 A | 12/2014 |
| JP | 2015022510 A | 2/2015 |
| JP | 2015522178 A | 8/2015 |
| JP | 2015534734 A | 12/2015 |
| JP | 5848754 B2 | 1/2016 |
| JP | 2016524125 A | 8/2016 |
| JP | 6140709 | 5/2017 |
| JP | 2017163550 A | 9/2017 |
| JP | 2017163587 A | 9/2017 |
| JP | 2017531976 A | 10/2017 |
| JP | 6546613 B2 | 7/2019 |
| JP | 2019-220957 A | 12/2019 |
| JP | 6630891 B2 | 12/2019 |
| JP | 2020017999 A | 1/2020 |
| JP | 6767543 B2 | 9/2020 |
| JP | 6767558 B2 | 9/2020 |
| KR | 1020050004239 A | 1/2005 |
| KR | 100496875 B1 | 6/2005 |
| KR | 1020110097647 A | 8/2011 |
| KR | 20140045373 A | 4/2014 |
| KR | 20170063827 A | 6/2017 |
| KR | 101824672 B1 | 2/2018 |
| KR | 101843994 B1 | 3/2018 |
| KR | 101973822 B1 | 4/2019 |
| KR | 10-2002165 B1 | 7/2019 |
| KR | 10-2111181 B1 | 5/2020 |
| SG | 191151 A1 | 7/2013 |
| SG | 11201500910 R | 10/2015 |
| TW | 200828994 A | 7/2008 |
| TW | 200939739 A | 9/2009 |
| TW | 201228382 A | 7/2012 |
| TW | 1535292 B | 5/2016 |
| WO | 1994020875 A3 | 9/1994 |
| WO | 2005057922 A1 | 6/2005 |
| WO | 2006039906 A2 | 4/2006 |
| WO | 2006039906 A3 | 4/2006 |
| WO | 2007013250 A1 | 2/2007 |
| WO | 2007083579 A1 | 7/2007 |
| WO | 2007134137 A2 | 11/2007 |
| WO | 2008045198 A2 | 4/2008 |
| WO | 2008050904 A1 | 5/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2010037512 A1 | 4/2010 |
| WO | 2011008443 A2 | 1/2011 |
| WO | 2011026527 A1 | 3/2011 |
| WO | 2011046607 A2 | 4/2011 |
| WO | 2011055655 A1 | 5/2011 |
| WO | 2011063347 A2 | 5/2011 |
| WO | 2011105814 A2 | 9/2011 |

(56) References Cited

FOREIGN PATENT DOCUMENTS

| | | |
|---|---|---|
| WO | 2011116203 A1 | 9/2011 |
| WO | 2011063347 A3 | 10/2011 |
| WO | 2011121117 A1 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2013166215 A1 | 11/2013 |
| WO | 2014004134 A1 | 1/2014 |
| WO | 2014005123 A1 | 1/2014 |
| WO | 2014031795 A1 | 2/2014 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014131038 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014149902 A1 | 9/2014 |
| WO | 2014150856 A1 | 9/2014 |
| WO | 2014153098 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |
| WO | 2015048906 A1 | 4/2015 |
| WO | 2015070105 A1 | 5/2015 |
| WO | 2015074078 A1 | 5/2015 |
| WO | 2015081279 A1 | 6/2015 |
| WO | 2015134996 A1 | 9/2015 |
| WO | 2015183824 A1 | 12/2015 |
| WO | 2016054089 A1 | 4/2016 |
| WO | 2016/172125 | 10/2016 |
| WO | 2016167814 A1 | 10/2016 |
| WO | 2016172125 A9 | 4/2017 |
| WO | 2018053181 A1 | 3/2018 |
| WO | 2019038193 A1 | 2/2019 |

OTHER PUBLICATIONS

Ansari et al., "3-D Face Modeling Using Two Views and a Generic Face Model with Application to 3-D Face Recognition", Proceedings of the IEEE Conference on Advanced Video and Signal Based Surveillance, Jul. 22, 2003, 9 pgs.
Aufderheide et al., "A MEMS-based Smart Sensor System for Estimation of Camera Pose for Computer Vision Applications", Research and Innovation Conference 2011, Jul. 29, 2011, pp. 1-10.
Baker et al., "Limits on Super-Resolution and How to Break Them", IEEE Transactions on Pattern Analysis and Machine Intelligence, Sep. 2002, vol. 24, No. 9, pp. 1167-1183.
Banz et al., "Real-Time Semi-Global Matching Disparity Estimation on the GPU", IEEE Transactions on Pattern Analysis and Machine Intelligence, Sep. 2002, vol. 24, No. 9, pp. 1167-1183.
Barron et al., "Intrinsic Scene Properties from a Single RGB-D Image", 2013 IEEE Conference on Computer Vision and Pattern Recognition, Jun. 23-28, 2013, Portland, OR, USA, pp. 17-24.
Bennett et al., "Multispectral Bilateral Video Fusion", Computer Graphics (ACM SIGGRAPH Proceedings), Jul. 25, 2006, published Jul. 30, 2006, 1 pg.
Bennett et al., "Multispectral Video Fusion", Computer Graphics (ACM SIGGRAPH Proceedings), Jul. 25, 2006, published Jul. 30, 2006, 1 pg.
Berretti et al., "Face Recognition by Super-Resolved 3D Models from Consumer Depth Cameras", IEEE Transactions on Information Forensics and Security, vol. 9, No. 9, Sep. 2014, pp. 1436-1448.
Bertalmio et al., "Image Inpainting", Proceedings of the 27th Annual Conference on Computer Graphics and Interactive Techniques, 2000, ACM Pres/Addison-Wesley Publishing Co., pp. 417-424.
Bertero et al., "Super-resolution in computational imaging", Micron, Jan. 1, 2003, vol. 34, Issues 6-7, 17 pgs.
Bishop et al., "Full-Resolution Depth Map Estimation from an Aliased Plenoptic Light Field", ACCV Nov. 8, 2010, Part II, LNCS 6493, pp. 186-200.
Bishop et al., "Light Field Superresolution", Computational Photography (ICCP), 2009 IEEE International Conference, Conference Date Apr. 16-17, published Jan. 26, 2009, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, published Aug. 18, 2011, pp. 972-986.
Blanz et al., "A Morphable Model for The Synthesis of 3D Faces", In Proceedings of ACM SIGGRAPH 1999, Jul. 1, 1999, pp. 187-194.
Borman, "Topics in Multiframe Superresolution Restoration", Thesis of Sean Borman, Apr. 2004, 282 pgs.
Borman et al., "Image Sequence Processing", Dekker Encyclopedia of Optical Engineering, Oct. 14, 2002, 81 pgs.
Borman et al., "Linear models for multi-frame super-resolution restoration under non-affine registration and spatially varying PSF", Proc. SPIE, May 21, 2004, vol. 5299, 12 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Borman et al., "Nonlinear Prediction Methods for Estimation of Clique Weighting Parameters in NonGaussian Image Models", Proc. SPIE, Sep. 22, 1998, vol. 3459, 9 pgs.
Borman et al., "Block-Matching Sub-Pixel Motion Estimation from Noisy, Under-Sampled Frames—An Empirical Performance Evaluation", Proc. SPIE, Dec. 28, 1998, vol. 3653, 10 pgs.
Borman et al., "Image Resampling and Constraint Formulation for Multi-Frame Super-Resolution Restoration", Proc SPIE, Dec. 28, 1998, vol. 3653, 10 pgs.
Bose et al., "Superresolution and Noise Filtering Using Moving Least Squares", IEEE Transactions on Image Processing, Aug. 2006, vol. 15, Issue 8, published Jul. 17, 2006, pp. 2239-2248.
Boye et al., "Comparison of Subpixel Image Registration Algorithms", Proc. of SPIE—IS&T Electronic Imaging, Feb. 3, 2009, vol. 7246, pp. 72460X-1-72460X-9; doi: 10.1117/12.810369.
Bruckner et al., "Thin wafer-level camera lenses inspired by insect compound eyes", Optics Express, Nov. 22, 2010, vol. 18, No. 24, pp. 24379-24394.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, May 13, 2010, 11 pgs.
Bryan et al., "Perspective Distortion from Interpersonal Distance Is an Implicit Visual Cue for Social Judgments of Faces", PLOS One, vol. 7, Issue 9, Sep. 26, 2012, e45301, doi:10.1371/journal.pone. 0045301, 9 pgs.

(56) References Cited

OTHER PUBLICATIONS

Bulat et al., "How far are we from solving the 2D & 3D Face Alignment problem? (and a dataset of 230,000 3D facial landmarks)", arxiv.org, Cornell University Library, 201 Olin Library Cornell University Ithaca, NY 14853, Mar. 21, 2017.
Cai et al., "3D Deformable Face Tracking with a Commodity Depth Camera", Proceedings of the European Conference on Computer Vision: Part III, Sep. 5-11, 2010, 14pgs.
Capel, "Image Mosaicing and Super-resolution", Retrieved on Nov. 10, 2012, Retrieved from the Internet at URL:<http://citeseerx.ist.psu.edu/viewdoc/download?doi=10.1.1.226.2643&rep=rep1&type=pdf>, 2001, 269 pgs.
Caron et al., "Multiple camera types simultaneous stereo calibration, Robotics and Automation (ICRA)", 2011 IEEE International Conference On, May 1, 2011 (May 1, 2011), pp. 2933-2938.
Carroll et al., "Image Warps for Artistic Perspective Manipulation", ACM Transactions on Graphics (TOG), vol. 29, No. 4, Jul. 26, 2010, Article No. 127, 9 pgs.
Chan et al., "Investigation of Computational Compound-Eye Imaging System with Super-Resolution Reconstruction", IEEE, ISASSP, Jun. 19, 2006, pp. 1177-1180.
Chan et al., "Extending the Depth of Field in a Compound-Eye Imaging System with Super-Resolution Reconstruction", Proceedings—International Conference on Pattern Recognition, Jan. 1, 2006, vol. 3, pp. 623-626.
Chan et al., "Super-resolution reconstruction in a computational compound-eye imaging system", Multidim. Syst. Sign. Process, published online Feb. 23, 2007, vol. 18, pp. 83-101.
Chen et al., "Interactive deformation of light fields", Symposium on Interactive 3D Graphics, 2005, pp. 139-146.
Chen et al., "KNN Matting", IEEE Transactions on Pattern Analysis and Machine Intelligence, Sep. 2013, vol. 35, No. 9, pp. 2175-2188.
Chen et al., "KNN matting", 2012 IEEE Conference on Computer Vision and Pattern Recognition, Jun. 16-21, 2012, Providence, RI, USA, pp. 869-876.
Chen et al., "Image Matting with Local and Nonlocal Smooth Priors", CVPR '13 Proceedings of the 2013 IEEE Conference on Computer Vision and Pattern Recognition, Jun. 23, 2013, pp. 1902-1907.
Chen et al., "Human Face Modeling and Recognition Through Multi-View High Resolution Stereopsis", IEEE Conference on Computer Vision and Pattern Recognition Workshop, Jun. 17-22, 2006, 6 pgs.
Collins et al., "An Active Camera System for Acquiring Multi-View Video", IEEE 2002 International Conference on Image Processing, Date of Conference: Sep. 22-25, 2002, Rochester, NY, 4 pgs.
Cooper et al., "The perceptual basis of common photographic practice", Journal of Vision, vol. 12, No. 5, Article 8, May 25, 2012, pp. 1-14.
Crabb et al., "Real-time foreground segmentation via range and color imaging", 2008 IEEE Computer Society Conference on Computer Vision and Pattern Recognition Workshops, Anchorage, AK, USA, Jun. 23-28, 2008, pp. 1-5.
Dainese et al., "Accurate Depth-Map Estimation For 3D Face Modeling", IEEE European Signal Processing Conference, Sep. 4-8, 2005, 4 pgs.
Debevec et al., "Recovering High Dynamic Range Radiance Maps from Photographs", Computer Graphics (ACM SIGGRAPH Proceedings), Aug. 16, 1997, 10 pgs.
Do, Minh N. "Immersive Visual Communication with Depth", Presented at Microsoft Research, Jun. 15, 2011, Retrieved from: http://minhdo.ece.illinois.edu/talks/ImmersiveComm.pdf, 42 pgs.
Do et al., Immersive Visual Communication, IEEE Signal Processing Magazine, vol. 28, Issue 1, Jan. 2011, DOI: 10.1109/MSP.2010.939075, Retrieved from: http://minhdo.ece.illinois.edu/publications/ImmerComm_SPM.pdf, pp. 58-66.
Dou et al., "End-to-end 3D face reconstruction with deep neural networks", arXiv:1704.05020v1, Apr. 17, 2017, 10 pgs.
Drouin et al., "Improving Border Localization of Multi-Baseline Stereo Using Border-Cut", International Journal of Computer Vision, Jul. 5, 2006, vol. 83, Issue 3, 8 pgs.
Drouin et al., "Fast Multiple-Baseline Stereo with Occlusion", Fifth International Conference on 3-D Digital Imaging and Modeling (3DIM'05), Ottawa, Ontario, Canada, Jun. 13-16, 2005, pp. 540-547.
Drouin et al., "Geo-Consistency for Wide Multi-Camera Stereo", 2005 IEEE Computer Society Conference on Computer Vision and Pattern Recognition (CVPR'05), vol. 1, Jun. 20-25, 2005, pp. 351-358.
Drulea et al., "Motion Estimation Using the Correlation Transform", IEEE Transactions on Image Processing, Aug. 2013, vol. 22, No. 8, pp. 3260-3270, first published May 14, 2013.
Duparre et al., "Microoptical artificial compound eyes—from design to experimental verification of two different concepts", Proc. of SPIE, Optical Design and Engineering II, vol. 5962, Oct. 17, 2005, pp. 59622A-1-59622A-12.
Duparre et al., Novel Optics/Micro-Optics for Miniature Imaging Systems, Proc. of SPIE, Apr. 21, 2006, vol. 6196, pp. 619607-1-619607-15.
Duparre et al., "Micro-optical artificial compound eyes", Bioinspiration & Biomimetics, Apr. 6, 2006, vol. 1, pp. R1-R16.
Duparre et al., "Artificial compound eye zoom camera", Bioinspiration & Biomimetics, Nov. 21, 2008, vol. 3, pp. 1-6.
Duparre et al., "Artificial apposition compound eye fabricated by micro-optics technology", Applied Optics, Aug. 1, 2004, vol. 43, No. 22, pp. 4303-4310.
Duparre et al., "Micro-optically fabricated artificial apposition compound eye", Electronic Imaging—Science and Technology, Prod. SPIE 5301, Jan. 2004, pp. 25-33.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Artificial compound eyes—different concepts and their application to ultra flat image acquisition sensors", MOEMS and Miniaturized Systems IV, Proc. SPIE 5346, Jan. 24, 2004, pp. 89-100.
Duparre et al., "Ultra-Thin Camera Based on Artificial Apposition Compound Eyes", 10th Microoptics Conference, Sep. 1-3, 2004, 2 pgs.
Duparre et al., "Microoptical telescope compound eye", Optics Express, Feb. 7, 2005, vol. 13, No. 3, pp. 889-903.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Microoptical Artificial Compound Eyes—Two Different Concepts for Compact Imaging Systems", 11th Microoptics Conference, Oct. 30-Nov. 2, 2005, 2 pgs.
Eng et al., "Gaze correction for 3D tele-immersive communication system", IVMSP Workshop, 2013 IEEE 11th. IEEE, Jun. 10, 2013.
Fanaswala, "Regularized Super-Resolution of Multi-View Images", Retrieved on Nov. 10, 2012 (Nov. 10, 2012). Retrieved from the Internet at URL:<http://www.site.uottawa.ca/-edubois/theses/Fanaswala_thesis.pdf>, 2009, 163 pgs.
Fang et al., "Volume Morphing Methods for Landmark Based 3D Image Deformation", SPIE vol. 2710, Proc. 1996 SPIE Intl Symposium on Medical Imaging, Newport Beach, CA, Feb. 10, 1996, pp. 404-415.
Fangmin et al., "3D Face Reconstruction Based on Convolutional Neural Network", 2017 10th International Conference on Intelligent Computation Technology and Automation, Oct. 9-10, 2017, Changsha, China.
Farrell et al., "Resolution and Light Sensitivity Tradeoff with Pixel Size", Proceedings of the SPIE Electronic Imaging 2006 Conference, Feb. 2, 2006, vol. 6069, 8 pgs.
Farsiu et al., "Advances and Challenges in Super-Resolution", International Journal of Imaging Systems and Technology, Aug. 12, 2004, vol. 14, pp. 47-57.

(56) References Cited

OTHER PUBLICATIONS

Farsiu et al., "Fast and Robust Multiframe Super Resolution", IEEE Transactions on Image Processing, Oct. 2004, published Sep. 3, 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, date of publication Dec. 12, 2005, pp. 141-159.
Fechteler et al., Fast and High Resolution 3D Face Scanning, IEEE International Conference on Image Processing, Sep. 16-Oct. 19, 2007, 4 pgs.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., "Optical System Design", 2nd Edition, SPIE Press, Feb. 14, 2008, pp. 49-58.
Fischer et al., "Optical System Design", 2nd Edition, SPIE Press, Feb. 14, 2008, pp. 191-198.
Garg et al., "Unsupervised CNN for Single View Depth Estimation: Geometry to the Rescue", In European Conference on Computer Vision, Springer, Cham, Jul. 2016, 16 pgs.
Gastal et al., "Shared Sampling for Real-Time Alpha Matting", Computer Graphics Forum, Eurographics 2010, vol. 29, Issue 2, May 2010, pp. 575-584.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Godard et al., "Unsupervised Monocular Depth Estimation with Left-Right Consistency", In Proceedings of the IEEE Conference on Computer Vision and Pattern Recognition, 2017, 14 pgs.
Goldman et al., "Video Object Annotation, Navigation, and Composition", In Proceedings of UIST 2008, Oct. 19-22, 2008, Monterey CA, USA, pp. 3-12.
Goodfellow et al., "Generative Adversarial Nets, 2014. Generative adversarial nets", In Advances in Neural Information Processing Systems (pp. 2672-2680).
Gortler et al., "The Lumigraph", In Proceedings of SIGGRAPH 1996, published Aug. 1, 1996, pp. 43-54.
Gupta et al., "Perceptual Organization and Recognition of Indoor Scenes from RGB-D Images", 2013 IEEE Conference on Computer Vision and Pattern Recognition, Jun. 23-28, 2013, Portland, OR, USA, pp. 564-571.
Hacohen et al., "Non-Rigid Dense Correspondence with Applications for Image Enhancement", ACM Transactions on Graphics, vol. 30, No. 4, Aug. 7, 2011, 9 pgs.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, published Nov. 19, 2007, vol. 16, No. 12, pp. 2953-2964.
Hasinoff et al., "Search-and-Replace Editing for Personal Photo Collections", 2010 International Conference: Computational Photography (ICCP) Mar. 2010, pp. 1-8.
Hernandez et al., "Laser Scan Quality 3-D Face Modeling Using a Low-Cost Depth Camera", 20th European Signal Processing Conference, Aug. 27-31, 2012, Bucharest, Romania, pp. 1995-1999.
Hernandez-Lopez et al., "Detecting objects using color and depth segmentation with Kinect sensor", Procedia Technology, vol. 3, Jan. 1, 2012, pp. 196-204, XP055307680, ISSN: 2212-0173, DOI: 10.1016/j.protcy.2012.03.021.
Higo et al., "A Hand-held Photometric Stereo Camera for 3-D Modeling", IEEE International Conference on Computer Vision, 2009, pp. 1234-1241.
Hirschmuller, "Accurate and Efficient Stereo Processing by Semi-Global Matching and Mutual Information", IEEE Conference on Computer Vision and Pattern Recognition (CVPR), San Diego, CA, USA, Jun. 20-26, 2005, 8 pgs.
Hirschmuller et al., "Memory Efficient Semi-Global Matching, ISPRS Annals of the Photogrammetry", Remote Sensing and Spatial Information Sciences, vol. I-3, 2012, XXII ISPRS Congress, Aug. 25-Sep. 1, 2012, Melbourne, Australia, 6 pgs.
Holoeye Photonics AG, "Spatial Light Modulators", Oct. 2, 2013, Brochure retrieved from https://web.archive.org/web/20131002061028/http://holoeye.com/wp-content/uploads/Spatial_Light_Modulators.pdf on Oct. 13, 2017, 4 pgs.
Holoeye Photonics AG, "Spatial Light Modulators", Sep. 18, 2013, retrieved from https://web.archive.org/web/20130918113140/http://holoeye.com/spatial-light-modulators/ on Oct. 13, 2017, 4 pgs.
Holoeye Photonics AG, "LC 2012 Spatial Light Modulator (transmissive)", Sep. 18, 2013, retrieved from https://web.archive.org/web/20130918151716/http://holoeye.com/spatial-light-modulators/lc-2012-spatial-light-modulator/ on Oct. 20, 2017, 3 pgs.
Horisaki et al., "Superposition Imaging for Three-Dimensionally Space-Invariant Point Spread Functions", Applied Physics Express, Oct. 13, 2011, vol. 4, pp. 112501-1-112501-3.
Horisaki et al., "Irregular Lens Arrangement Design to Improve Imaging Performance of Compound-Eye Imaging Systems", Applied Physics Express, Jan. 29, 2010, vol. 3, pp. 022501-1-022501-3.
Horn et al., "LightShop: Interactive Light Field Manipulation and Rendering", In Proceedings of I3D, Jan. 1, 2007, pp. 121-128.
Hossain et al., "Inexpensive Construction of a 3D Face Model from Stereo Images", IEEE International Conference on Computer and Information Technology, Dec. 27-29, 2007, 6 pgs.
Hu et al., "A Quantitative Evaluation of Confidence Measures for Stereo Vision", IEEE Transactions on Pattern Analysis and Machine Intelligence, vol. 34, Issue 11, Nov. 2012, pp. 2121-2133.
Humenberger er al., "A Census-Based Stereo Vision Algorithm Using Modified Semi-Global Matching and Plane Fitting to Improve Matching Quality", IEEE Computer Society Conference on Computer Vision and Pattern Recognition Workshops (CVPRW), IEEE, Jun. 13-18, 2010, San Francisco, CA, 8 pgs.
Isaksen et al., "Dynamically Reparameterized Light Fields", In Proceedings of SIGGRAPH 2000, 2000, pp. 297-306.
Izadi et al., "KinectFusion: Real-time 3D Reconstruction and Interaction Using a Moving Depth Camera", UIST'11, Oct. 16-19, 2011, Santa Barbara, CA, pp. 559-568.
Jackson et al., "Large Post 3D Face Reconstruction from a Single Image via Direct Volumetric CNN Regression", arXiv: 1703.07834v2, Sep. 8, 2017, 9 pgs.
Janoch et al., "A category-level 3-D object dataset: Putting the Kinect to work", 2011 IEEE International Conference on Computer Vision Workshops (ICCV Workshops), Nov. 6-13, 2011, Barcelona, Spain, pp. 1168-1174.
Jarabo et al., "Efficient Propagation of Light Field Edits", In Proceedings of SIACG 2011, 2011, pp. 75-80.
Jiang et al., "Panoramic 3D Reconstruction Using Rotational Stereo Camera with Simple Epipolar Constraints", 2006 IEEE Computer Society Conference on Computer Vision and Pattern Recognition (CVPR'06), vol. 1, Jun. 17-22, 2006, New York, NY, USA, pp. 371-378.
Joshi, Color Calibration for Arrays of Inexpensive Image Sensors, Mitsubishi Electric Research Laboratories, Inc., TR2004-137, Dec. 2004, 6 pgs.
Joshi et al., "Synthetic Aperture Tracking: Tracking Through Occlusions", I CCV IEEE 11th International Conference on Computer Vision; Publication [online], Oct. 2007 [retrieved Jul. 28, 2014], Retrieved from the Internet: <URL http:l/ieeexplore.ieee.org/stamp/stamp.jsp?tp=&arnumber=4409032&isnumber=4408819>, pp. 1-8.

(56) References Cited

OTHER PUBLICATIONS

Jourabloo, "Large-Pose Face Alignment via CNN-Based Dense 3D Model Fitting", I CCV IEEE 11th International Conference on Computer Vision; Publication [online], Oct. 2007 [retrieved Jul. 28, 2014], Retrieved from the Internet: <URL http:l/ieeexplore.ieee.org/stamp/stamp.jsp?tp=&arnumber=4409032&isnumber=4408819>; pp. 1-8.

Kang et al., "Handling Occlusions in Dense Multi-view Stereo", Computer Vision and Pattern Recognition, 2001, vol. 1, pp. I-103-I-110.

Keeton, "Memory-Driven Computing", Hewlett Packard Enterprise Company, Oct. 20, 2016, 45 pgs.

Kim, "Scene Reconstruction from a Light Field", Master Thesis, Sep. 1, 2010 (Sep. 1, 2010), pp. 1-72.

Kim et al., "Scene reconstruction from high spatio-angular resolution light fields", ACM Transactions on Graphics (TOG)—SIGGRAPH 2013 Conference Proceedings, vol. 32 Issue 4, Article 73, Jul. 21, 2013, 11 pages.

Kitamura et al., "Reconstruction of a high-resolution image on a compound-eye image-capturing system", Applied Optics, Mar. 10, 2004, vol. 43, No. 8, pp. 1719-1727.

Kittler et al., "3D Assisted Face Recognition: A Survey of 3D Imaging, Modelling, and Recognition Approaches", Proceedings of the IEEE Computer Society Conference on Computer Vision and Pattern Recognition, Jul. 2005, 7 pgs.

Konolige, Kurt "Projected Texture Stereo", 2010 IEEE International Conference on Robotics and Automation, May 3-7, 2010, pp. 148-155.

Kotsia et al., "Facial Expression Recognition in Image Sequences Using Geometric Deformation Features and Support Vector Machines", IEEE Transactions on Image Processing, Jan. 2007, vol. 16, No. 1, pp. 172-187.

Krishnamurthy et al., "Compression and Transmission of Depth Maps for Image-Based Rendering", Image Processing, 2001, pp. 828-831.

Kubota et al., "Reconstructing Dense Light Field From Array of Multifocus Images for Novel View Synthesis", IEEE Transactions on Image Processing, vol. 16, No. 1, Jan. 2007, pp. 269-279.

Kutulakos et al., "Occluding Contour Detection Using Affine Invariants and Purposive Viewpoint Control", Computer Vision and Pattern Recognition, Proceedings CVPR 94, Seattle, Washington, Jun. 21-23, 1994, 8 pgs.

Lai et al., "A Large-Scale Hierarchical Multi-View RGB-D Object Dataset", Proceedings—IEEE International Conference on Robotics and Automation, Conference Date May 9-13, 2011, 8 pgs., DOI:10.1109/ICRA.201135980382.

Lane et al., "A Survey of Mobile Phone Sensing", IEEE Communications Magazine, vol. 48, Issue 9, Sep. 2010, pp. 140-150.

Lao et al., "3D template matching for pose invariant face recognition using 3D facial model built with isoluminance line based stereo vision", Proceedings 15th International Conference on Pattern Recognition, Sep. 3-7, 2000, Barcelona, Spain, pp. 911-916.

Lee, "NFC Hacking: The Easy Way", Defcon Hacking Conference, 2012, 24 pgs.

Lee et al., "Electroactive Polymer Actuator for Lens-Drive Unit in Auto-Focus Compact Camera Module", ETRI Journal, vol. 31, No. 6, Dec. 2009, pp. 695-702.

Lee et al., "Nonlocal matting", CVPR 2011, Jun. 20-25, 2011, pp. 2193-2200.

Lee et al., "Automatic Upright Adjustment of Photographs", IEEE Conference on Computer Vision and Pattern Recognition (CVPR), 2012, pp. 877-884.

Lensvector, "How LensVector Autofocus Works", 2010, printed Nov. 2, 2012 from http://www.lensvector.com/overview.html, 1 pg.

Levin et al., "A Closed Form Solution to Natural Image Matting", IEEE Conference on Computer Vision and Pattern Recognition (CVPR), 2006, vol. 1, pp. 61-68.

Levin et al., "Spectral Matting", 2007 IEEE Conference on Computer Vision and Pattern Recognition, Jun. 17-22, 2007, Minneapolis, MN, USA, pp. 1-8.

Levoy, "Light Fields and Computational Imaging", IEEE Computer Society, Sep. 1, 2006, vol. 39, Issue No. 8, pp. 46-55.

Levoy et al., "Light Field Rendering", Proc. ADM SIGGRAPH '96, 1996, pp. 1-12.

Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.

Li et al., "Fusing Images with Different Focuses Using Support Vector Machines", IEEE Transactions on Neural Networks, vol. 15, No. 6, Nov. 8, 2004, pp. 1555-1561.

Lim, "Optimized Projection Pattern Supplementing Stereo Systems", 2009 IEEE International Conference on Robotics and Automation, May 12-17, 2009, pp. 2823-2829.

Liu et al., "Virtual View Reconstruction Using Temporal Information", 2012 IEEE International Conference on Multimedia and Expo, 2012, pp. 115-120.

Lo et al., "Stereoscopic 3D Copy & Paste", ACM Transactions on Graphics, vol. 29, No. 6, Article 147, Dec. 2010, pp. 147:1-147:10.

Ma et al., "Constant Time Weighted Median Filtering for Stereo Matching and Beyond", ICCV'13 Proceedings of the 2013 IEEE International Conference on Computer Vision, IEEE Computer Society, Washington DC, USA, Dec. 1-8, 2013, 8 pgs.

Martinez et al., "Simple Telemedicine for Developing Regions: Camera Phones and Paper-Based Microfluidic Devices for Real-Time, Off-Site Diagnosis", Analytical Chemistry (American Chemical Society), vol. 80, No. 10, May 15, 2008, pp. 3699-3707.

McGuire et al., "Defocus video matting", ACM Transactions on Graphics (TOG)—Proceedings of ACM SIGGRAPH 2005, vol. 24, Issue 3, Jul. 2005, pp. 567-576.

Medioni et al., "Face Modeling and Recognition in 3-D", Proceedings of the IEEE International Workshop on Analysis and Modeling of Faces and Gestures, 2013, 2 pgs.

Merkle et al., "Adaptation and optimization of coding algorithms for mobile 3DTV", MobileSDTV Project No. 216503, Nov. 2008, 55 pgs.

Michael et al., "Real-time Stereo Vision: Optimizing Semi-Global Matching", 2013 IEEE Intelligent Vehicles Symposium (IV), IEEE, Jun. 23-26, 2013, Australia, 6 pgs.

Milella et al., "3D reconstruction and classification of natural environments by an autonomous vehicle using multi-baseline stereo", Intelligent Service Robotics, vol. 7, No. 2, Mar. 2, 2014, pp. 79-92.

Min et al., "Real-Time 3D Face Identification from a Depth Camera", Proceedings of the IEEE International Conference on Pattern Recognition, Nov. 11-15, 2012, 4 pgs.

Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.

Moreno-Noguer et al., "Active Refocusing of Images and Videos", ACM Transactions on Graphics (TOG)—Proceedings of ACM SIGGRAPH 2007, vol. 26, Issue 3, Jul. 2007, 10 pgs.

Muehlebach, "Camera Auto Exposure Control for VSLAM Applications", Studies on Mechatronics, Swiss Federal Institute of Technology Zurich, Autumn Term 2010 course, 67 pgs.

Nayar, "Computational Cameras: Redefining the Image", IEEE Computer Society, Aug. 14, 2006, pp. 30-38.

Ng, "Digital Light Field Photography", Thesis, Jul. 2006, 203 pgs.

Ng et al., "Super-Resolution Image Restoration from Blurred Low-Resolution Images", Journal of Mathematical Imaging and Vision, 2005, vol. 23, pp. 367-378.

Ng et al., "Light Field Photography with a Hand-held Plenoptic Camera", Stanford Tech Report CTSR Feb. 2005, Apr. 20, 2005, pp. 1-11.

Nguyen et al., "Image-Based Rendering with Depth Information Using the Propagation Algorithm", Proceedings. (ICASSP '05). IEEE International Conference on Acoustics, Speech, and Signal Processing, 2005, vol. 5, Mar. 23-23, 2005, pp. II-589-II-592.

Nguyen et al., "Error Analysis for Image-Based Rendering with Depth Information", IEEE Transactions on Image Processing, vol. 18, Issue 4, Apr. 2009, pp. 703-716.

(56) References Cited

OTHER PUBLICATIONS

Nishihara, H.K. "PRISM: A Practical Real-Time Imaging Stereo Matcher", Massachusetts Institute of Technology, A.I. Memo 780, May 1984, 32 pgs.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, Jun. 2007, 12 pgs.
Park et al., "Super-Resolution Image Reconstruction", IEEE Signal Processing Magazine, May 2003, pp. 21-36.
Park et al., "Multispectral Imaging Using Multiplexed Illumination", 2007 IEEE 11th International Conference on Computer Vision, Oct. 14-21, 2007, Rio de Janeiro, Brazil, pp. 1-8.
Park et al., "3D Face Reconstruction from Stereo Video", First International Workshop on Video Processing for Security, Jun. 7-9, 2006, Quebec City, Canada, 2006, 8 pgs.
Parkkinen et al., "Characteristic Spectra of Munsell Colors", Journal of the Optical Society of America A, vol. 6, Issue 2, Feb. 1989, pp. 318-322.
Perwass et al., "Single Lens 3D-Camera with Extended Depth-of-Field", printed from www.raytrix.de, Jan. 22, 2012, 15 pgs.
Pham et al., "Robust Super-Resolution without Regularization", Journal of Physics: Conference Series 124, Jul. 2008, pp. 1-19.
Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs.
Polight, "Designing Imaging Products Using Reflowable Autofocus Lenses", printed Nov. 2, 2012 from http://www.polight.no/tunable-polymer-autofocus-lens-html--11.html, 1 pg.
Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Dec. 2, 2008, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 8, 2003, pp. 1-16.
Rander et al., "Virtualized Reality: Constructing Time-Varying Virtual Worlds from Real World Events", Proc. of IEEE Visualization '97, Phoenix, Arizona, Oct. 19-24, 1997, pp. 277-283, 552.
Ranjan et al., "HyperFace: A Deep Multi-Task Learning Framework for Face Detection, Landmark Localization, Pose Estimation, and Gender Recognition", May 11, 2016 (May 11, 2016), pp. 1-16.
Rhemann et al., "Fast Cost-Volume Filtering for Visual Correspondence and Beyond", IEEE Trans. Pattern Anal. Mach. Intell, 2013, vol. 35, No. 2, pp. 504-511.
Rhemann et al., "A perceptually motivated online benchmark for image matting", 2009 IEEE Conference on Computer Vision and Pattern Recognition, Jun. 20-25, 2009, Miami, FL, USA, pp. 1826-1833.
Robert et al., "Dense Depth Map Reconstruction: A Minimization and Regularization Approach which Preserves Discontinuities", European Conference on Computer Vision (ECCV), pp. 439-451, (1996).
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2002, pp. 208-215.
Rusinkiewicz et al., "Real-Time 3D Model Acquisition", ACM Transactions on Graphics (TOG), vol. 21, No. 3, Jul. 2002, pp. 438-446.
Saatci et al., "Cascaded Classification of Gender and Facial Expression using Active Appearance Models", IEEE, FGR'06, 2006, 6 pgs.
Sauer et al., "Parallel Computation of Sequential Pixel Updates in Statistical Tomographic Reconstruction", ICIP 1995 Proceedings of the 1995 International Conference on Image Processing, Date of Conference: Oct. 23-26, 1995, pp. 93-96.
Scharstein et al., "High-Accuracy Stereo Depth Maps Using Structured Light", IEEE Computer Society Conference on Computer Vision and Pattern Recognition (CVPR 2003), Jun. 2003, vol. 1, pp. 195-202.
Seitz et al., "Plenoptic Image Editing", International Journal of Computer Vision 48, Conference Date Jan. 7, 1998, 29 pgs., DOI: 10.1109/ICCV.1998.710696 • Source: DBLP Conference: Computer Vision, Sixth International Conference.
Shechtman et al., "Increasing Space-Time Resolution in Video", European Conference on Computer Vision, LNCS 2350, May 28-31, 2002, pp. 753-768.
Shotton et al., "Real-time human pose recognition in parts from single depth images", CVPR 2011, Jun. 20-25, 2011, Colorado Springs, CO, USA, pp. 1297-1304.
Shum et al., "Pop-Up Light Field: An Interactive Image-Based Modeling and Rendering System", Apr. 2004, ACM Transactions on Graphics, vol. 23, No. 2, pp. 143-162, Retrieved from http://131.107.65.14/en-us/um/people/jiansun/papers/PopupLightField_TOG.pdf on Feb. 5, 2014.
Shum et al., "A Review of Image-based Rendering Techniques", Visual Communications and Image Processing 2000, May 2000, 12 pgs.
Sibbing et al., "Markerless reconstruction of dynamic facial expressions", 2009 IEEE 12th International Conference on Computer Vision Workshops, ICCV Workshop: Kyoto, Japan, 27 Sep. 27-Oct. 4, 2009, Institute of Electrical and Electronics Engineers, Piscataway, NJ, Sep. 27, 2009 (Sep. 27, 2009), pp. 1778-1785.
Silberman et al., "Indoor segmentation and support inference from RGBD images", ECCV'12 Proceedings of the 12th European conference on Computer Vision, vol. Part V, Oct. 7-13, 2012, Florence, Italy, pp. 746-760.
Stober, "Stanford researchers developing 3-D camera with 12,616 lenses", Stanford Report, Mar. 19, 2008, Retrieved from: http://news.stanford.edu/news/2008/march19/camera-031908.html, 5 pgs.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs.; DOI: 10.1109/CVPR.2008.4587659.
Taguchi et al., "Rendering-Oriented Decoding fora Distributed Multiview Coding System Using a Coset Code", Hindawi Publishing Corporation, EURASIP Journal on Image and Video Processing, vol. 2009, Article ID 251081, Online: Apr. 22, 2009, 12 pgs.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Thin observation module by bound optics (TOMBO): concept and experimental verification", Applied Optics, Apr. 10, 2001, vol. 40, No. 11, pp. 1806-1813.
Tanida et al., "Color imaging with an integrated compound imaging system", Optics Express, Sep. 8, 2003, vol. 11, No. 18, pp. 2109-2117.
Tao et al., "Depth from Combining Defocus and Correspondence Using Light-Field Cameras", ICCV '13 Proceedings of the 2013 IEEE International Conference on Computer Vision, Dec. 1, 2013, pp. 673-680.

(56) References Cited

OTHER PUBLICATIONS

Taylor, "Virtual camera movement: The way of the future?", American Cinematographer, vol. 77, No. 9, Sep. 1996, pp. 93-100.
Tseng et al., "Automatic 3-D depth recovery from a single urban-scene image", 2012 Visual Communications and Image Processing, Nov. 27-30, 2012, San Diego, CA, USA, pp. 1-6.
Uchida et al., 3D Face Recognition Using Passive Stereo Vision, IEEE International Conference on Image Processing 2005, Sep. 14, 2005, 4 pgs.
Vaish et al., "Reconstructing Occluded Surfaces Using Synthetic Apertures: Stereo, Focus and Robust Measures", 2006 IEEE Computer Society Conference on Computer Vision and Pattern Recognition (CVPR'06), vol. 2, Jun. 17-22, 2006, pp. 2331-2338.
Vaish et al., "Using Plane + Parallax for Calibrating Dense Camera Arrays", IEEE Conference on Computer Vision and Pattern Recognition (CVPR), 2004, 8 pgs.
Vaish et al., "Synthetic Aperture Focusing Using a Shear-Warp Factorization of the Viewing Transform", IEEE Workshop on A3DISS, CVPR, 2005, 8 pgs.
Van Der Wal et al., "The Acadia Vision Processor", Proceedings Fifth IEEE International Workshop on Computer Architectures for Machine Perception, Sep. 13, 2000, Padova, Italy, pp. 31-40.
Veilleux, "CCD Gain Lab: The Theory", University of Maryland, College Park-Observational Astronomy (ASTR 310), Oct. 19, 2006, pp. 1-5 (online), [retrieved on May 13, 2014], Retrieved from the Internet <URL: http://www.astro.umd.edu/~veilleux/ASTR310/fall06/ccd_theory.pdf, 5 pgs.
Venkataraman et al., "PiCam: An Ultra-Thin High Performance Monolithic Camera Array", ACM Transactions on Graphics (TOG), ACM, US, vol. 32, No. 6, 1 Nov. 1, 2013, pp. 1-13.
Vetro et al., "Coding Approaches for End-To-End 3D TV Systems", Mitsubishi Electric Research Laboratories, Inc., TR2004-137, Dec. 2004, 6 pgs.
Viola et al., "Robust Real-time Object Detection", Cambridge Research Laboratory, Technical Report Series, Compaq, CRL Jan. 2001, Feb. 2001, Printed from: http://www.hpl.hp.com/techreports/Compaq-DEC/CRL-2001-1.pdf, 30 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008, 5 pgs.
Wang, "Calculation of Image Position, Size and Orientation Using First Order Properties", Dec. 29, 2010, OPTI521 Tutorial, 10 pgs.
Wang et al., "Soft scissors: an interactive tool for realtime high quality matting", ACM Transactions on Graphics (TOG)—Proceedings of ACM SIGGRAPH 2007, vol. 26, Issue 3, Article 9, Jul. 2007, 6 pg., published Aug. 5, 2007.
Wang et al., "Automatic Natural Video Matting with Depth", 15th Pacific Conference on Computer Graphics and Applications, PG '07, Oct. 29-Nov. 2, 2007, Maui, HI, USA, pp. 469-472.
Wang et al., "Image and Video Matting: A Survey", Foundations and Trends, Computer Graphics and Vision, vol. 3, No. 2, 2007, pp. 91-175.
Wang et al., "Facial Feature Point Detection: A Comprehensive Survey", arXiv: 1410.1037v1, Oct. 4, 2014, 32 pgs . . . .
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, Mar. 11, 2005, vol. 5674, 12 pgs.
Widanagamaachchi et al., "3D Face Recognition from 2D Images: A Survey", Proceedings of the International Conference on Digital Image Computing: Techniques and Applications, Dec. 1-3, 2008, 7 pgs.
Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.
Wikipedia, "Polarizing Filter (Photography)", retrieved from http://en.wikipedia.org/wiki/Polarizing_filter_(photography) on Dec. 12, 2012, last modified on Sep. 26, 2012, 5 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceedings of the 2004 IEEE Computer Society Conference on Computer Vision and Pattern Recognition, 2004. CVPR 2004., vol. 2, Jun. 27-Jul. 2, 2004, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, pp. 59622C-1-59622C-11.
Wu et al., "A virtual view synthesis algorithm based on image inpainting", 2012 Third International Conference on Networking and Distributed Computing, Hangzhou, China, Oct. 21-24, 2012, pp. 153-156.
Xu, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.
Yang et al., "Superresolution Using Preconditioned Conjugate Gradient Method", Proceedings of SPIE—The International Society for Optical Engineering, Jul. 2002, 8 pgs.
Yang et al., "A Real-Time Distributed Light Field Camera", Eurographics Workshop on Rendering (2002), published Jul. 26, 2002, pp. 1-10.
Yang et al., Model-based Head Pose Tracking with Stereovision, Microsoft Research, Technical Report, MSR-TR-2001-102, Oct. 2001, 12 pgs.
Yokochi et al., "Extrinsic Camera Parameter Estimation Based-on Feature Tracking and GPS Data", 2006, Nara Institute of Science and Technology, Graduate School of Information Science, LNCS 3851, pp. 369-378.
Zbontar et al., Computing the Stereo Matching Cost with a Convolutional Neural Network, CVPR, 2015, pp. 1592-1599.
Zhang et al., "A Self-Reconfigurable Camera Array", Eurographics Symposium on Rendering, published Aug. 8, 2004, 12 pgs.
Zhang et al., "Depth estimation, spatially variant image registration, and super-resolution using a multi-lenslet camera", proceedings of SPIE, vol. 7705, Apr. 23, 2010, pp. 770505-770505-8, XP055113797 ISSN: 0277-786X, DOI: 10.1117/12.852171.
Zhang et al., "Spacetime Faces: High Resolution Capture for Modeling and Animation", ACM Transactions on Graphics, 2004, 11pgs.
Zheng et al., "Balloon Motion Estimation Using Two Frames", Proceedings of the Asilomar Conference on Signals, Systems and Computers, IEEE, Comp. Soc. Press, US, vol. 2 of 2, Nov. 4, 1991, pp. 1057-1061.
Zhu et al., "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.
Zomet et al., "Robust Super-Resolution", IEEE, 2001, pp. 1-6.
"File Formats Version 6", Alias Systems, 2004, 40 pgs.
"Light fields and computational photography", Stanford Computer Graphics Laboratory, Retrieved from: http://graphics.stanford.edu/projects/lightfield/, Earliest publication online: Feb. 10, 1997, 3 pgs.
"Exchangeable image file format for digital still cameras: Exif Version 2.2"_, Japan Electronics and Information Technology Industries Association, Prepared by Technical Standardization Committee on AV & IT Storage Systems and Equipment, JEITA CP-3451, Apr. 2002, Retrieved from: http://www.exif.org/Exif2-2.PDF, 154 pgs.
International Search Report and Written Opinion for International Application No. PCT/US20/63044, dated Mar. 12, 2021, 14 pages.
Sheng et al., "A Generative Model for Depth-based Robust 3D Facial Pose Tracking," Proceedings of the IEEE Conference on

(56) References Cited

OTHER PUBLICATIONS

Computer Vision and Pattern Recognition (CVPR) [online], pp. 4488-4497, published 2017 [retrieved Jan. 28, 2021].
Fieraru et al., "Learning to Refine Human Pose Estimation," Proceedings of the IEEE Conference on Computer Vision and Pattern Recognition (CVPR) Workshops, [online], pp. 318-327, published 2018 [retrieved Jan. 28, 2021].
Fieraru et al., "Learning to Refine Human Pose Estimation," Proceedings of the IEEE Conference on Computer Vision and Pattern Recognition (CVPR) Workshops, 2018, Abstract, 2 pages.
Acuna, David et al., "Devil is in the Edges: Learning Semantic Boundaries from Noisy Annotations," (2019) In *Proceedings of the IEEE/CVF Conference on Computer Vision and Pattern Recognition* (pp. 11075-11083).
Peng, Sida et al., "PVNet: Pixel-wise Voting Network for 6DoF Pose Estimation," (2019) In *Proceedings of the IEEE/CVF Conference on Computer Vision and Pattern Recognition* (pp. 4561-4570).

\* cited by examiner

SYSTEMS AND METHODS FOR CHARACTERIZING OBJECT POSE DETECTION AND MEASUREMENT SYSTEMS

CROSS-REFERENCE TO RELATED APPLICATIONS

This application is a continuation of U.S. patent application Ser. No. 17/279,339, filed Mar. 24, 2021, which is a U.S. National Phase Patent Application of International Application Number PCT/US20/63044, filed Dec. 3, 2020, which claims priority to and the benefit of U.S. Provisional Patent Application No. 62/967,487, filed in the United States Patent and Trademark Office on Jan. 29, 2020, the entire disclosure of each of which is incorporated by reference herein.

FIELD

Aspects of embodiments of the present disclosure relate to the field of sensors, in particular systems and methods for characterizing the accuracy and precision of object pose measurement systems.

BACKGROUND OF THE INVENTION

In many areas of automation, such as robotics, sensors are used to determine the physical relationship of objects in the real world. For example, robotic systems often use sensing systems to measure the locations of various physical objects in order to, for example, grasp an object that may arrive at a variety of orientations, reorient the object into a desired position, and connect the object to another object. The position and orientation of an object with respect to a reference coordinate system may be referred to as a "pose" and, in a three-dimensional coordinate system, generally includes six degrees of freedom—rotation around three axes and translation along the three axes.

SUMMARY OF THE INVENTION

Aspects of embodiments of the present disclosure relate to systems and methods for characterizing the accuracy and precision of object pose measurement systems.

According to one embodiment of the present disclosure, a method for characterizing a pose estimation system, includes: receiving, from a pose estimation system, by a characterization system including a processor and a memory, a first plurality of poses of an arrangement of objects in a first scene; receiving, from the pose estimation system, by the characterization system, a second plurality of poses of the arrangement of objects in a second scene, the second scene being a rigid transformation of the arrangement of objects of the first scene with respect to the pose estimation system; computing, by the characterization system, a coarse scene transformation between the first scene and the second scene; matching, by the characterization system, corresponding poses between the first plurality of poses and the second plurality of poses; computing, by the characterization system, a refined scene transformation between the first scene and the second scene based on coarse scene transformation, the first poses, and the second poses; transforming, by the characterization system, the first plurality of poses based on the refined scene transformation to compute a plurality of transformed first poses; and computing an average rotation error and an average translation error of the pose estimation system based on differences between the transformed first poses and the second plurality of poses.

The rigid transformation of the arrangement of objects with respect to the pose estimation system may include: a rotation of the arrangement of objects.

The arrangement of objects may be on a support platform, and the characterization system may be configured to control the support platform to rigidly transform the arrangement of objects with respect to the pose estimation system.

A fiducial, adjacent the arrangement of objects, may be imaged in the first scene, rigidly transformed with the arrangement of objects, and imaged in the second scene, and the coarse scene transformation between the first scene and the second scene may be computed based on computing a first pose of the fiducial imaged in the first scene and a second pose of the fiducial imaged in the second scene.

The matching the corresponding poses between the first plurality of poses and the second plurality of poses may be performed by: transforming the first plurality of poses in accordance with the coarse scene transformation to compute a plurality of coarsely transformed first poses; and for each coarsely transformed first pose of the first coarsely transformed first poses: identifying a second pose of the second poses closest to the coarsely transformed first pose; and determining that the transformed first pose and the second pose closest to the coarsely transformed first pose match when a distance between the coarsely transformed first pose and the second pose closest to the coarsely transformed first pose is less than a false-positive threshold distance.

The matching the corresponding poses between the first plurality of poses and the second plurality of poses may be performed by: transforming the first plurality of poses in accordance with the coarse scene transformation to compute a plurality of coarsely transformed first poses; and for each coarsely transformed first pose of the first coarsely transformed first poses: identifying a second pose of the second poses closest to the coarsely transformed first pose; identifying a type of an object corresponding to the coarsely transformed first pose and the second pose; positioning a first 3-D model of the type of the object at the coarsely transformed first pose; positioning a second 3-D model of the type of the object at the second pose; and determining that the coarsely transformed first pose and the second pose closest to the coarsely transformed first pose match when an intersection between the positioned first 3-D model and the positioned second 3-D model satisfies a false-positive threshold intersection.

The computing the refined scene transformation may include: initializing a current scene transformation based on the coarse scene transformation; computing a plurality of first poses as transformed by the current scene transformation; and updating the current scene transformation in accordance with reducing a cost function computed based on differences between the second poses and the first poses as transformed by the current scene transformation.

The average rotation error may be computed based on a sum of the rotation errors between the differences between rotational components of the transformed first poses and the second plurality of poses, and the average translation error may be computed based on a sum of the translation errors between the differences between translation components of the transformed first poses and the second plurality of poses.

The average rotation error $R_{err}$ may be computed in accordance with:

$$R_{err} = \frac{1}{n}\sum_i \|R((P^i_{S_1} T_{S_1 S_2})^{-1} Q^i_{S_2})\|,$$

and
wherein the average translation error $T_{err}$ may be computed in accordance with:

$$T_{err} = \frac{1}{n}\sum_i \|T((P^i_{S_1} T_{S_1 S_2})^{-1} Q^i_{S_2})\|,$$

where $P_{S_1}^i$ is an i-th pose of the first poses, $Q_{S_2}^i$ is an i-th pose of the second poses, $T_{S_1 S_2}$ is the refined scene transformation from the first scene $S_1$ to the second scene $S_2$, and n is the number of first poses and the number of second poses.

According to one embodiment of the present disclosure, a system for characterizing a pose estimation system, includes: a processor; and a memory storing instructions that, when executed by the processor, cause the processor to: receive, from a pose estimation system, a first plurality of poses of an arrangement of objects in a first scene; receive, from the pose estimation system, a second plurality of poses of the arrangement of objects in a second scene, the second scene being a rigid transformation of the arrangement of objects of the first scene with respect to the pose estimation system; compute a coarse scene transformation between the first scene and the second scene; match corresponding poses between the first plurality of poses and the second plurality of poses; compute a refined scene transformation between the first scene and the second scene based on coarse scene transformation, the first poses, and the second poses; transform the first plurality of poses based on the refined scene transformation to compute a plurality of transformed first poses; and compute an average rotation error and an average translation error of the pose estimation system based on differences between the transformed first poses and the second plurality of poses.

The rigid transformation of the arrangement of objects with respect to the pose estimation system may include a rotation of the arrangement of objects.

The system may further include a support platform, and the memory may further stores instructions that, when executed by the processor, cause the processor to control the support platform to rigidly transform the arrangement of objects with respect to the pose estimation system from the first scene to the second scene.

A fiducial, adjacent the arrangement of objects, may be imaged in the first scene, rigidly transformed with the arrangement of objects, and imaged in the second scene, and the coarse scene transformation between the first scene and the second scene may be computed based on computing a first pose of the fiducial imaged in the first scene and a second pose of the fiducial imaged in the second scene.

The memory may further store instructions that, when executed by the processor, cause the processor to match the corresponding poses between the first plurality of poses and the second plurality of poses by: transforming the first plurality of poses in accordance with the coarse scene transformation to compute a plurality of transformed first poses; and for each transformed first pose of the first transformed first poses: identifying a second pose of the second poses closest to the transformed first pose; and determining that the transformed first pose and the second pose closest to the transformed first pose match when a distance between the transformed first pose and the second pose closest to the transformed first pose is less than a false-positive threshold distance.

The memory may further store instructions that, when executed by the processor, cause the processor to match the corresponding poses between the first plurality of poses and the second plurality of poses by: transforming the first plurality of poses in accordance with the coarse scene transformation to compute a plurality of transformed first poses; and for each transformed first pose of the first transformed first poses: identifying a second pose of the second poses closest to the transformed first pose; identifying a type of an object corresponding to the transformed first pose and the second pose; positioning a first 3-D model of the type of the object at the transformed first pose; positioning a second 3-D model of the type of the object at the second pose; and determining that the transformed first pose and the second pose closest to the transformed first pose match when an intersection between the positioned first 3-D model and the positioned second 3-D model satisfies a false-positive threshold intersection.

The memory may further store instructions that, when executed by the processor, cause the processor to compute the refined scene transformation by: initializing a current scene transformation based on the coarse scene transformation; computing a plurality of first poses as transformed by the current scene transformation; and updating the current scene transformation in accordance with reducing a cost function computed based on differences between the second poses and the first poses as transformed by the current scene transformation.

The memory may further store instructions that, when executed by the processor, cause the processor to: compute the average rotation error based on a sum of the rotation errors between the differences between rotational components of the transformed first poses and the second plurality of poses, and compute the average translation error based on a sum of the translation errors between the differences between translation components of the transformed first poses and the second plurality of poses.

The average rotation error $R_{err}$ may be computed in accordance with:

$$R_{err} = \frac{1}{n}\sum_i \|R((P^i_{S_1} T_{S_1 S_2})^{-1} Q^i_{S_2})\|,$$

and
the average translation error $T_{err}$ may be computed in accordance with:

$$T_{err} = \frac{1}{n}\sum_i \|T((P^i_{S_1} T_{S_1 S_2})^{-1} Q^i_{S_2})\|,$$

where $P_{S_1}^i$ is an i-th pose of the first poses, $Q_{S_2}^i$ is an i-th pose of the second poses, $T_{S_1 S_2}$ is the refined scene transformation from the first scene $S_1$ to the second scene $S_2$, and n is the number of first poses and the number of second poses.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE INVENTION

Figure 1:
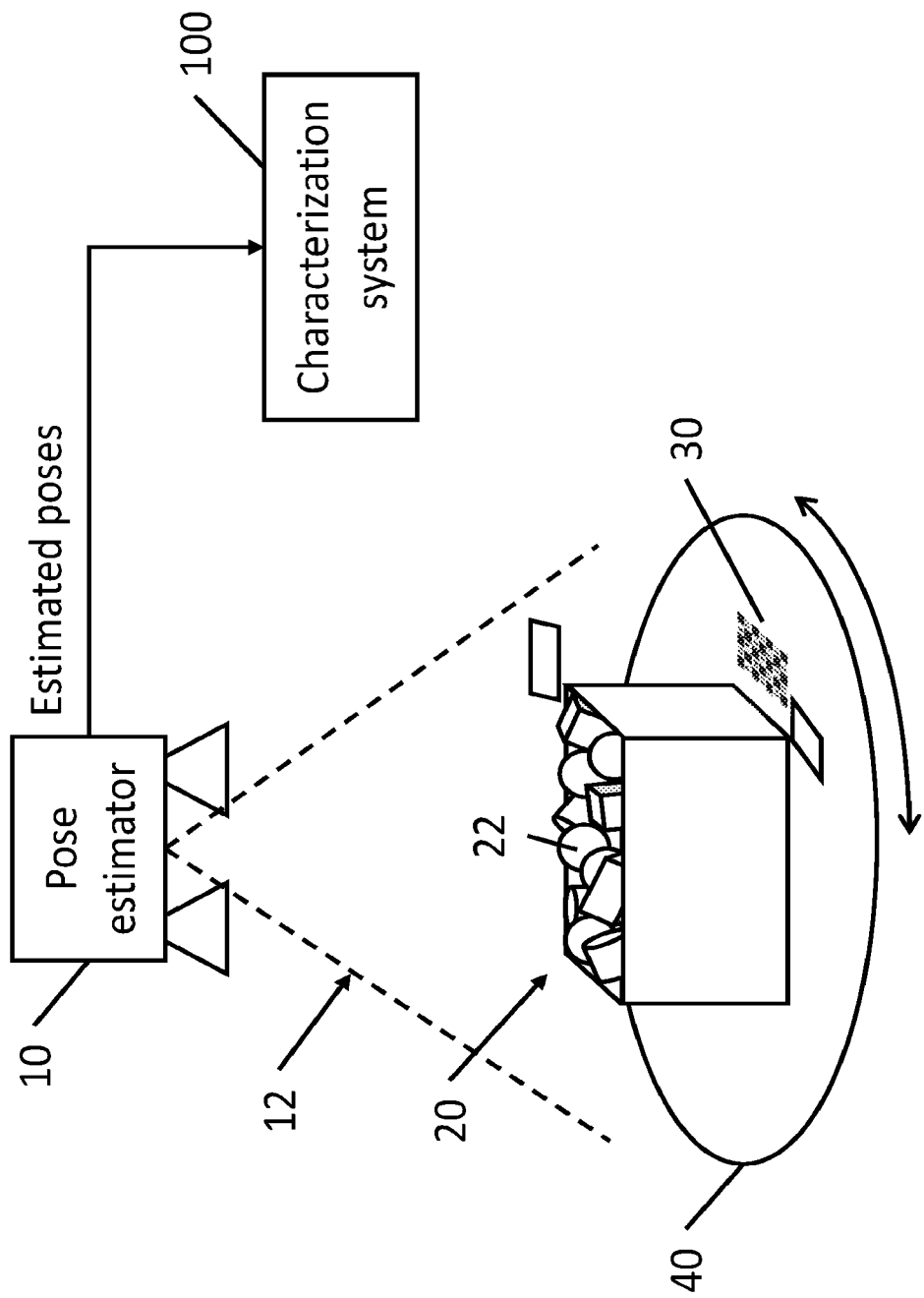
FIG. 1 is a schematic diagram depicting a characterization system according to one embodiment of the present disclosure for characterizing a pose estimation system.

In the following detailed description, only certain exemplary embodiments of the present invention are shown and described, by way of illustration. As those skilled in the art would recognize, the invention may be embodied in many different forms and should not be construed as being limited to the embodiments set forth herein.

Pose estimation generally refers to a computer vision technique for estimating or predicting the location and orientation of objects. Some forms of pose estimation refer to detecting the physical pose of a human figure, such as the position and orientation of a person's head, arms, legs, and joints. Pose estimation may also refer more generally to the position and orientation of various animate or inanimate physical objects in a scene. For example, autonomously navigating robots may maintain information regarding the physical poses of objects around them in order to avoid collisions and to predict trajectories of other moving objects. As another example, in the case of robotics for use in manufacturing, pose estimation may be used by robots to detect the position and orientation of components, such that a robot arm can approach the component from the correct angle to obtain a proper grip on the part for assembly with other components of a manufactured product (e.g., gripping the head of a screw and threading the screw into a hole, whereas gripping a screw by the tip would make it difficult to insert into a hole).

There are a variety of techniques for performing pose estimation, including three-dimensional (3D) scanners that capture depth information regarding a scene. For example, pose estimation may be performed by capturing images using stereo vision systems (e.g., based on depth from stereo), which may be active (with an active light emitter, which may emit a pattern of light or structured light). As another example, time of flight sensing may be used to measure depth of surfaces in a scene based on the time between the emission of light and the detection of its reflection. Further computer vision techniques such as instance segmentation using a convolutional neural may also be used to separate individual objects from one another, and further computer vision analysis may be performed to determine the poses of the objects with respect to one another. These various pose estimation techniques may exhibit different tradeoffs regarding, for example, accuracy, precision, latency, power consumption, and the like.

Some applications of pose estimations may require higher precision than others, and therefore different approaches to pose estimation may be better suited for different tasks, based on the design constraints of those tasks.

Generally, characterizing the error rate of a system involves computing the difference between the outputs of a system to a known true value or actual value ("ground truth"), and aggregating the differences, such as by computing a mean absolute error (MAE), a mean squared error (MSE), or a root mean square error (RMSE).

However, it is often difficult to obtain a ground truth set of poses for characterizing a pose estimation system, at least because there are few techniques for measuring the poses of objects. This is for three main reasons. First, methods for accurately estimating the pose are limited to very high resolution point clouds followed by some version of applying an iterative closest point algorithm to align the point clouds. These methods are costly and do not guarantee the accuracy required to obtain a high quality ground truth. Second, a pose must always be with respect to a specific coordinate space, and to compare two poses, they must be in the same coordinate space. Obtaining the transformation in an error-free way is non-trivial. For example, if transform between coordinate spaces is correct to 100 microns, and the application specifications require accuracy to 40 microns, there is no way for the estimated transform to be used to measure at the higher precision of 40 microns. Third, certain objects, such as small objects and transparent objects (e.g., made of glass or transparent plastic) are optically challenging to image and comparative 3-D scanning or sensing systems are not capable of obtaining get high resolution dense point clouds of these types of objects.

As such, aspects of embodiments of the present disclosure are directed to systems and methods for characterizing a pose estimation system, such as characterizing the rotational error and the translational error in the poses computed by the pose estimation system at high precision. For example, some embodiments of the present disclosure are capable of characterizing pose errors in pose estimation systems at a resolution of 30 microns (30 micrometers) and 0.3 degrees. Comparative systems operating in similar conditions are generally limited to accuracies of 300 microns or more.

FIG. 1 is a schematic diagram depicting a characterization system according to one embodiment of the present disclosure for characterizing a pose estimation system. As shown in FIG. 1, a pose estimation system 10 (or pose estimator) is arranged such that its field of view 12 captures an arrangement 20 of objects 22. In the embodiment shown in FIG. 1, the pose estimator 10 is located above the support platform 40 (e.g., spaced apart from the objects 22 along the direction of gravity), but embodiments of the present disclosure are not limited thereto—for example, the pose estimator may be arranged to have a downward angled view of the objects 22.

In some embodiments, a fiducial 30 (or marker) such as a ChArUco board (e.g., a checkerboard pattern of alternating black and white squares with ArUco fiducial markers in each of the white squares, where ArUco markers are described, for example, in Garrido-Jurado, Sergio, et al. "Automatic generation and detection of highly reliable fiducial markers under occlusion." *Pattern Recognition* 47.6 (2014): 2280-2292.) The arrangement 20 of objects 22 and the fiducial 30 may be placed on a movable support platform 40 such as a rotatable turntable.

The support platform 40 is configured to perform a physical rigid transformation of the arrangement 20 of objects 22 together with the fiducial 30 with respect to the pose estimator 10, while keeping the relative positions and orientations of the objects 22 with respect to one another and the fiducial 30 substantially fixed. For example, in the case of the use of a turntable as the movable support platform 40, the rigid transformation may be a rotation (as indicated by the arrows) around a vertical axis (e.g., an axis aligned with gravity).

A characterization system 100 according to various embodiments of the present disclosure is configured to characterize the performance of the pose estimator 10, such as predicting or calculating the average pose error (e.g., rotation error and translation error) in the estimated poses of the objects 22 computed by the pose estimator 10.

In more detail, the pose estimator 10 is configured to estimate the poses of objects detected within its field of view 12. In the embodiment shown in FIG. 1, the objects 22 are depicted abstractly as simple three-dimensional solids such as spheres, rectangular prisms, and cylinders. However, embodiments of the present disclosure are not limited thereto and characterization of pose estimators may be performed using any arbitrary object for which a pose with respect to a camera can be clearly defined.

In particular, a "pose" refers to the position and orientation of an object with respect to a reference coordinate system. For example, a reference coordinate system may be defined with the pose estimation system 10 at the origin, where the direction along the optical axis of the pose estimation system 10 (e.g., a direction through the center of its field of view 12) is defined as the z-axis of the coordinate system, and the x and y axes are defined to be perpendicular to one another and perpendicular to the z-axis. (Embodiments of the present disclosure are not limited to this particular coordinate system, and a person having ordinary skill in the art would understand that poses may be transformed between different coordinate systems.)

Each object 22 may also be associated with a corresponding coordinate system of its own, which is defined with respect to its particular shape. For example, a rectangular prism with sides of different lengths may have a canonical coordinate system defined where the x-axis is parallel to its shortest direction, z-axis is parallel to its longest direction, the y-axis is orthogonal to the x-axis and z-axis, and the origin is located at the centroid of the object 22.

Generally, in a three-dimensional coordinate system, objects 22 have six degrees of freedom—rotation around three axes (e.g., rotation around x-, y-, and z-axes) and translation along the three axes (e.g., translation along x-, y-, and z-axes). For the sake of clarity, symmetries of the objects 22 will not be discussed in detail herein, but may be addressed, for example, by identifying multiple possible poses with respect to different symmetries (e.g., in the case of selecting the positive versus negative directions of the z-axis of a right rectangular prism), or by ignoring some rotational components of the pose (e.g., a right cylinder is rotationally symmetric around its axis).

In some embodiments, it is assumed that a three-dimensional (3-D) model or computer aided design (CAD) model representing a canonical or ideal version of each type of object 22 in the arrangement of objects 20 is available. For example, in some embodiments of the present disclosure, the objects 22 are individual instances of manufactured components that have a substantially uniform appearance from one component to the next. Examples of such manufactured components include screws, bolts, nuts, connectors, and springs, as well as specialty parts such electronic circuit components (e.g., packaged integrated circuits, light emitting diodes, switches, resistors, and the like), laboratory supplies (e.g. test tubes, PCR tubes, bottles, caps, lids, pipette tips, sample plates, and the like), and manufactured parts (e.g., handles, switch caps, light bulbs, and the like). Accordingly, in these circumstances, a CAD model defining the ideal or canonical shape of any particular object 22 in the arrangement 20 may be used to define a coordinate system for the object (e.g., the coordinate system used in the representation of the CAD model).

Based on a reference coordinate system (or camera space, e.g., defined with respect to the pose estimation system) and an object coordinate system (or object space, e.g., defined with respect to one of the objects), the pose of the object may be considered to be a rigid transform (rotation and translation) from object space to camera space. The pose of object 1 in camera space 1 may be denoted as $P_{c_1}^{1}$, and the transform from object 1 space to camera space may be represented by the matrix:

$$\begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix}$$

where the rotation submatrix R:

$$R = \begin{bmatrix} R_{11} & R_{12} & R_{13} \\ R_{21} & R_{22} & R_{23} \\ R_{31} & R_{32} & R_{33} \end{bmatrix}$$

represents rotations along the three axes from object space to camera space, and the translation submatrix T:

$$T = \begin{bmatrix} T_1 \\ T_2 \\ T_3 \end{bmatrix}$$

represents translations along the three axes from object space to camera space.

If two objects—Object A and Object B—are in the same camera C coordinate frame, then the notation $P_{CA}$ is used to indicate the pose of Object A with respect to camera C and $P_{CB}$ is used to indicate the pose of Object B with respect to camera C. For the sake of convenience, it is assumed herein that the poses of objects are represented based on the reference coordinate system, so the poses of objects A and B with respect to camera space C may be denoted $P_A$ and $P_B$, respectively.

If Object A and Object B are actually the same object, but performed during different pose estimation measurements, and a residual pose $P_{err}$ or $P_{AB}$ ($P_{AB}=P_{err}$) is used to indicate a transform from pose $P_A$ to pose $P_B$, then the following relationship should hold:

$$P_A P_{err} = P_B \quad (1)$$

and therefore $$P_{err} = P_A^{-1} P_B \quad (2)$$

Ideally, assuming the object has not moved (e.g., translated or rotated) with respect to the pose estimator 10 between the measurements of pose estimates $P_A$ and $P_B$, then $P_A$ and $P_B$ should both be the same, and $P_{err}$ should be the identity matrix (e.g., indicating no error between the poses):

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

Similarly, the above would hold if the object underwent a known rigid transformation T and pose $P_B$ represented the estimated pose $P_B'$ after transforming the estimated pose back to the original scene ($P_B = P_B'T$) or, alternatively, if pose $P_A$ represented the estimated pose after applying transformation T to the estimated pose to transform it to the new scene ($P_A = P_A'T$).

Differences between the actual measured value $P_{err}$, as computed based on the estimates computed by the pose estimator 10 and the identity matrix may be considered to be errors:

$$R_{err} = \|R(P_{err})\| \quad (3)$$

$$T_{err} = \|T(P_{err})\| \quad (4)$$

where $R_{err}$ is the rotation error and $T_{err}$ is the translation error. The function R( ) converts $P_{err}$ into an axis-angle where the magnitude is the rotation difference, and the function T( ) extracts the translation component of the pose matrix.

The axis-angle representation from rotation matrix R is given by:

$$Tr(R) = 1 + 2\cos\theta \quad (5)$$

$$|\theta| = \arccos\left(\frac{Tr(R) - 1}{2}\right) \quad (6)$$

where Tr( ) denotes the matrix trace (the sum of the diagonal elements of the matrix), and $\theta$ represents the angle of rotation Accordingly, some aspects of embodiments of the present disclosure relate to applying the above pose comparison framework for characterizing a pose estimation system 10.

Figure 2:
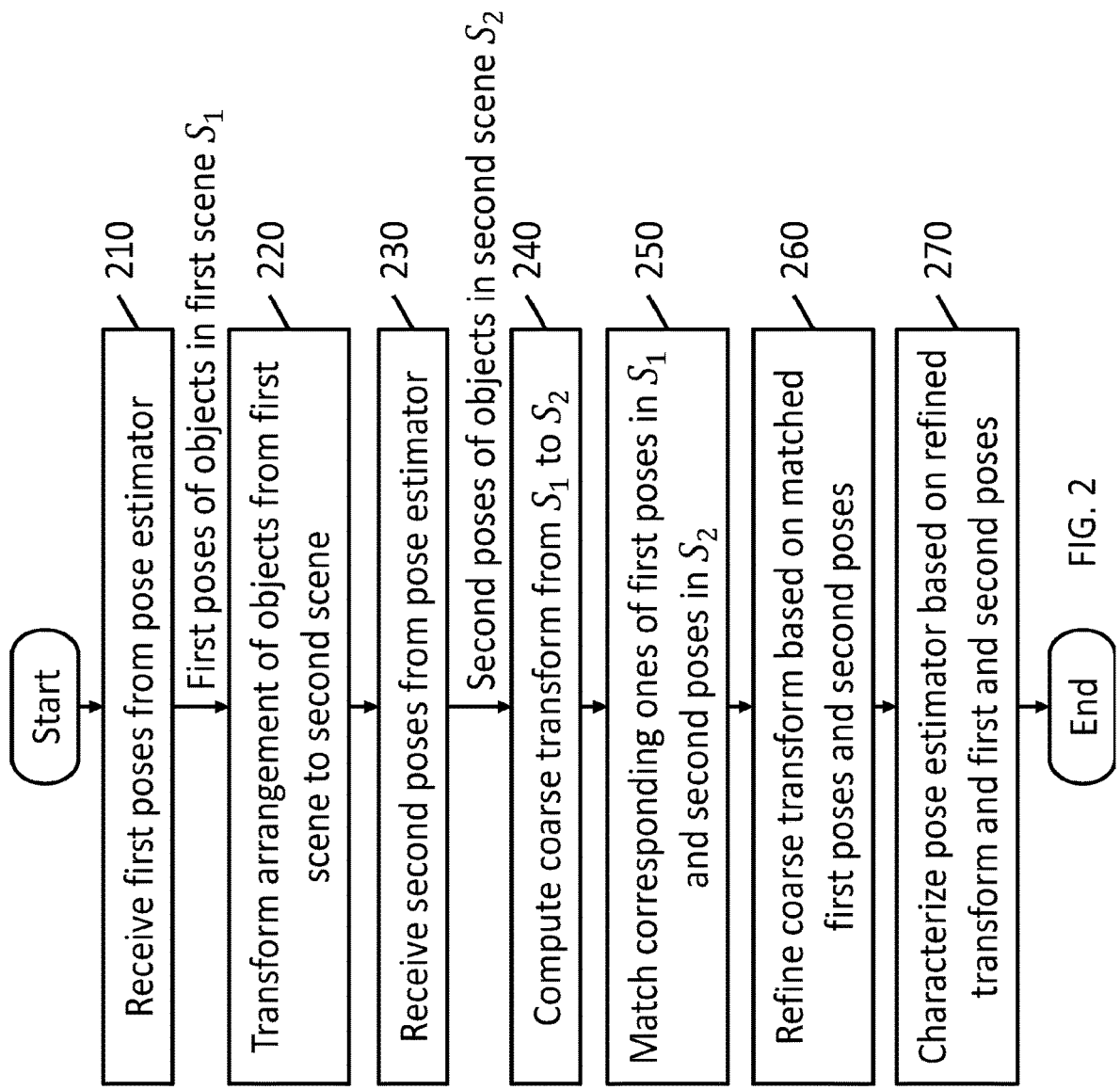
FIG. 2 is a flowchart of a method according to one embodiment of the present disclosure for characterizing a pose estimation system.

FIG. 2 is a flowchart of a method according to one embodiment of the present disclosure for characterizing a pose estimation system. In some embodiments of the present disclosure, methods in accordance with embodiments of the present disclosure are performed using a characterization system 100, which may include a computing device (e.g., a laptop computer, desktop computer, embedded system, or the like), which includes a processor and memory (e.g., dynamic random access memory and a mass storage device), where the memory stores instructions that configure the computing device to perform special-purpose operations for performing characterization of a pose estimator 10 by executing the instructions on the processor. In some embodiments, the output computed by the characterization system 100 is used to generate a report regarding the performance of the pose estimator 10, may be used to provide feedback to the pose estimator 10 (e.g., to calibrate the pose estimator 10), and/or may be supplied as input to other processes, such as for recording the performance of the pose estimator 10 with respect to a particular test.

Referring to FIG. 2, in operation 210 the characterization system 100 receives a first plurality of poses of objects 22 in an arrangement 20 of a first scene $S_1$. The poses may be denoted as $\{P_{S_1}^1, P_{S_1}^2, \ldots, P_{S_1}^i, \ldots, P_{S_1}^n\}$ in first scene $S_1$. The pose estimator 10 may compute the first poses of the objects 22 based on its particular internal techniques, which are outside of the scope of this disclosure. One example of an approach to computing pose estimates in to use depth-from-stereo to capture images of the scene from multiple angles and using block matching and disparity measurements to compute the depth of various surfaces in the scene, applying instance segmentation to segment the scene into separate instances of the various objects (e.g., separating one shape from another shape), and performing pose estimation of each instance of the objects (e.g., determining the location of the centroid and rotation of the object with respect to a reference coordinate system) by registering each instance detected in a scene with a canonical three-dimensional model of the corresponding type of object (e.g., registering an instance of a cylinder of a known shape and size to a canonical 3-D model of the cylinder, such as by applying iterative closest point, see, e.g., Arun, Somani; Thomas S. Huang; Steven D. Blostein (1987). "Least-square fitting of two 3-D point sets". *IEEE Pattern Analysis and Machine Intelligence*.).

Accordingly, the pose estimator 10 estimates a first plurality of poses of various ones of the objects 22 in the arrangement 20 of a first scene $S_1$. For example, the plurality of poses may be represented as a collection (e.g., an array) of matrices representing the rotation and translation of the individual objects from their canonical object spaces to camera space. The poses may also include information regarding the classifications of the objects (e.g., in the example shown in FIG. 1, whether each pose corresponds to the pose of a sphere, a rectangular prism, or a cylinder). In some circumstances, the pose estimator 10 may be able to compute poses for only a subset of the objects 22 in the arrangement 20, such as only the top layer of objects that are substantially not occluded by other objects (e.g., where surfaces of the object are not blocked by other objects).

In operation 220, the arrangement 20 of objects 22 is rigidly transformed to form a second scene $S_2$ based on the first scene $S_1$. In more detail, applying a rigid transformation, with respect to the pose estimator 10, to the arrangement 20 as a whole maintains the physical relationships of the objects 22 with respect to one another (e.g., without changing the physical distances between the objects 22 or the orientations of the objects with respect to one another), but changes the physical relationship of the arrangement and the pose estimator 10.

As shown in FIG. 1, the arrangement 20 of objects 22 is located on a support platform 40 that is configured to perform the rigid transformation of the arrangement 20 of objects 22 without disturbing the arrangement 20 (e.g., without substantially changing the physical relationship of the objects with respect to one another). In some embodiments, the characterization system 100 is configured to control the support platform 40 by specifying the form of the rigid transformation (e.g., translation and/or rotation of the arrangement 20). For example, the support platform 40 may include one or more motors (e.g., stepper motors) or other electronically controlled actuators for rotating and/or translating objects that are located on the support platform 40.

(In some circumstances, it may be functionally equivalent to form the second scene $S_2$ by rotating and/or translating the pose estimation system 10 in a manner that maintains the arrangement 20 of objects 22 in the field of view 12 of the pose estimation system 10.)

Figure 3:
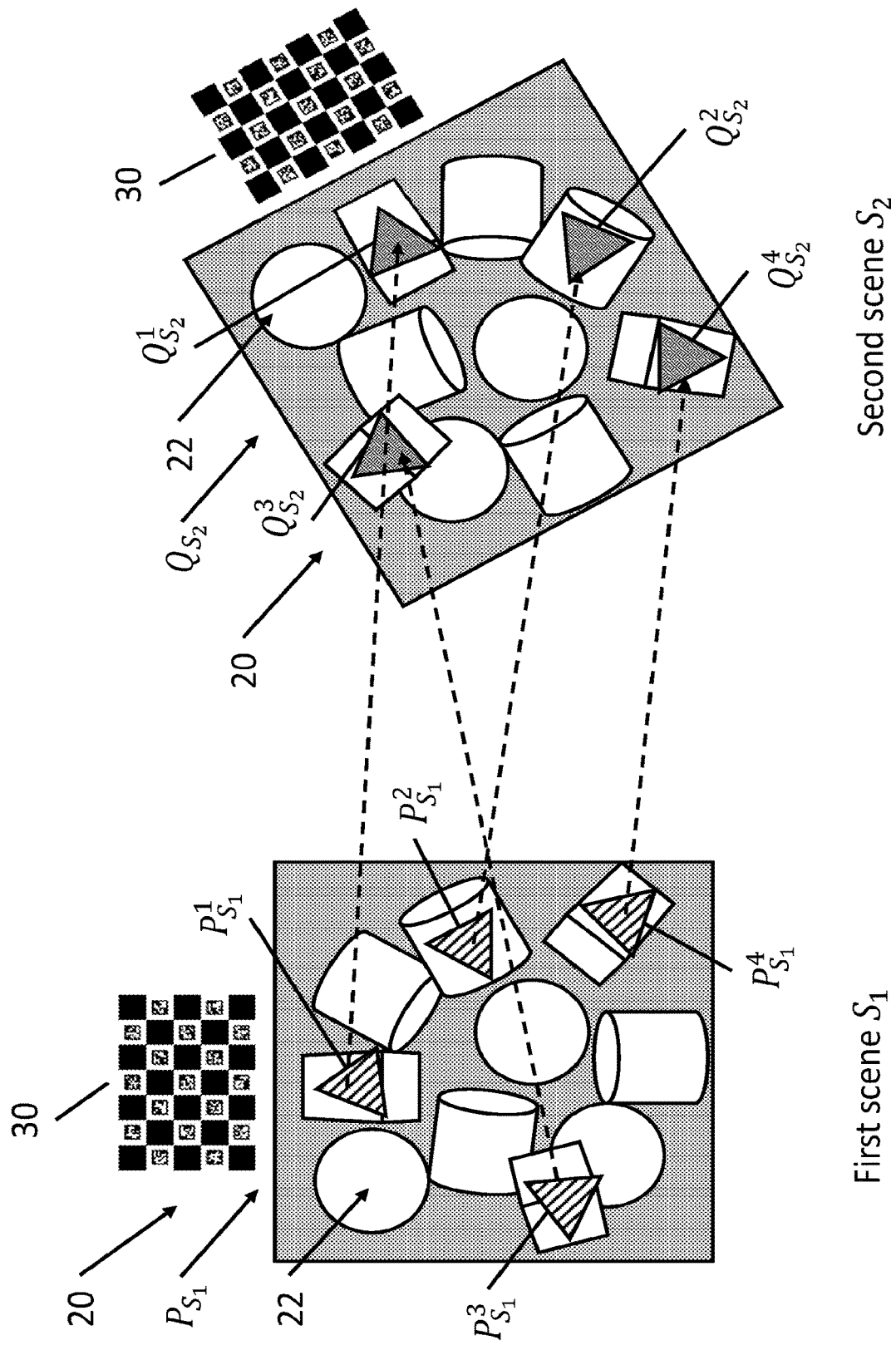
FIG. 3 is a schematic depiction of the rigid transformation of an arrangement of objects in a first scene with respect to a pose estimation system to form a second scene with respect to the pose estimation system, including depictions of the estimated poses $P_{S_1}$ of objects in the arrangement in a first scene $S_1$ and the estimated poses $Q_{S_2}$ of objects in the arrangement in a second scene $S_2$.

FIG. 3 is a schematic diagram of the rigid transformation of an arrangement of objects in a first scene $S_1$ with respect to a pose estimation system to form a second scene $S_2$ with respect to the pose estimation system. In particular, in the embodiment shown in FIG. 3, the arrangement 20 of objects 22 is located on a turntable with the centroid of the arrangement 20 located at the axis of rotation. The left side of FIG. 3 depicts a first scene $S_1$, and the right side of FIG. 3 depicts a second scene $S_2$ formed by controlling the turntable to rotate 60 degrees clockwise, thereby rigidly rotating the arrangement 20 by 60 degrees.

While FIG. 1 and FIG. 3 depict embodiments in which the support platform 40 is a turntable that rotates the arrangement 20 of objects 22 around the centroid of the arrangement 20, embodiments of the present disclosure are not limited thereto and may also include circumstances in which the support platform 40 performs both a rotation and a translation of the arrangement 20, such as by placing the arrangement 20 of objects 22 such that its centroid is not aligned with the axis of rotation of the turntable, or by using a support platform 40 that is capable of performing translations.

In operation 230, the characterization system 100 receives a second plurality of poses of the objects 22 in the arrangement 20 of a second scene $S_2$, where the second plurality of poses of the objects 22 are computed by the same pose estimation system 10 as the first plurality of poses in second scene $S_2$. The second plurality of poses may be denoted as $\{Q_{S_2}^1, Q_{S_2}^2, \ldots, Q_{S_3}^i, \ldots, Q_{S_4}^n\}$. For the purposes of this discussion, it is assumed that the first poses $P_{S_2}$ and the second poses $Q_{S_2}$ both include n poses for the same n objects. However, embodiments of the present disclosure are not limited thereto and techniques for addressing mismatches will be described below.

Given the first plurality of estimated poses $\{P_{S_1}^1, P_{S_1}^2, \ldots, P_{S_1}^i, \ldots, P_{S_1}^n\}$ of the objects in first scene $S_1$ and the second plurality of estimated poses $\{Q_{S_2}^1, Q_{S_2}^2, \ldots, Q_{S_3}^i, \ldots, Q_{S_4}^n\}$ of the same objects in second scene $S_2$, these poses can then be compared to measure the error characteristics of the pose estimator 10. However, the precise values associated with the rigid transformation $T_{S_1S_2}$ (e.g., applied by the support platform 40) are unknown, thereby making it difficult to compare the relative values of the first plurality of poses to the second plurality of poses. Accordingly, aspects of embodiments of the present disclosure relate to computing an estimate of the rigid transformation $T_{S_1S_2}$.

In operation 240, the characterization system 100 computes a coarse scene transformation $T_{coarse}$ between the first scene $S_1$ and the second scene $S_2$. In some embodiments of the present disclosure, a distinctive marker or fiducial 30 is included with the arrangement 20 of objects 22 and appears in both the first scene $S_1$ and the second scene $S_2$, where the fiducial 30 is rigidly transformed together with the arrangement 20 of objects 22, such that the physical relationship between the fiducial 30 and the objects 22 is maintained through the transformation, thereby enabling the fiducial 30 to provide a reference for computing the coarse scene transformation $T_{coarse}$. In the embodiments shown in FIGS. 1 and 3, a ChArUco board is used as the fiducial 30 and is placed next to the arrangement 20 of objects 22. Generally, a ChArUco board is a checkerboard pattern with black or dark squares in the four corners and ArUco markers (or other markers) in the white squares. Each ArUco marker in the ChArUco board has a different pattern that encodes a different identifier. Accordingly, a computer vision system can detect the pose of the ChArUco board in an image based on the positions and arrangements of the individual ArUco markers within the board. By computing the poses $T_{S_1C}$ and $T_{S_2C}$ of the ChArUco board from images of the ChArUco board before and after applying a rigid transform, respectively, the characterization system 100 according to some embodiments of the present disclosure computes a coarse scene transformation $T_{coarse}$ from the first scene $S_1$ to the second scene $S_2$:

$$T_{coarse} = T_{S_1C} T_{S_2C}^{-1} \quad (7)$$

In some embodiments of the present disclosure, other types of fiducials 30 are placed in the scene and used to compute the coarse scene transformation, such as a grid of ArUco markers (e.g., without the checkerboard), augmented reality tags (ARTag), AprilTags, one or more rulers, one or more protractors, and the like.

In various other embodiments of the present disclosure, other techniques may be used to compute a coarse scene transformation. For example, in embodiments of the present disclosure where the support platform 40 can be controlled at high precision, the coarse scene transformation may be computed based on the known transformation applied by the support platform 40. As another example, a coarse scene transformation may be computed based on treating the points poses as point clouds (e.g., considering the positions only) and registering or aligning the point clouds (e.g., by applying an iterative closest point algorithm). As a further example, the two poses can be matched using a graph matching approach. The pose estimator 10 computes a 3-D connected graph from each component in the set of poses of $S_1$ to each other component in the set of poses of $S_2$. Then the pose estimator computes a feature vector for each element in $S_1$ and each element in $S_2$ using the relative transformation (R and T) between itself and its closest neighbors (e.g., its five closest neighbors). These relative transformations are then used to compute correspondences between $S_1$ and $S_2$ (e.g., finding poses in $S_1$ and $S_2$ that have similar relative transformations to its closest neighbors). After finding correspondences between poses in $S_1$ and poses in $S_2$, the pose estimator 10 computes one or more 3-D rigid body transform estimations using, for example, random sample consensus (RANSAC) where inliers are defined as correspondences less than a threshold distance (e.g., 3 mm). The estimated rigid body transform with the most inliers could be used as $T_{coarse}$.

In operation 250, the characterization system 100 matches corresponding ones of the first poses in $\{P_{S_1}^1, P_{S_1}^2, \ldots, P_{S_1}^i, \ldots, P_{S_1}^n\}$ of the objects in first scene $S_1$ with the second plurality of estimated poses $\{Q_{S_2}^1, Q_{S_2}^2, \ldots, Q_{S_3}^i, \ldots, Q_{S_4}^n\}$ of the same objects in second scene $S_2$. FIG. 3 is a schematic depiction of the rigid transformation of an arrangement of objects in a first scene with respect to a pose estimation system to form a second scene with respect to the pose estimation system, including depictions of the estimated poses $P_{S_1}$ of objects in the arrangement in a first scene $S_1$ and the estimated poses $Q_{S_2}$ of objects in the arrangement in a second scene $S_2$. FIG. 3 depicts arrows with dotted lines from some of the objects 22 in the first scene $S_1$ to corresponding objects 22 in the second scene $S_2$ (e.g., matching up the different views of the same objects in the different scenes). In the arrangement shown in FIG. 3, the first estimated poses $P_{S_1}$ computed by the pose estimation system 10 for the first scene $S_1$ are depicted as triangles with diagonal striped shading, and the second estimated poses $Q_{S_2}$ are depicted as triangles with dotted shading, where the centers of the triangles are aligned with the estimated centroids of their corresponding objects, and the angle of rotation of the triangle indicates (in the two dimensional constraints of the page) the estimated rotational pose of the corresponding objects.

Figure 4:
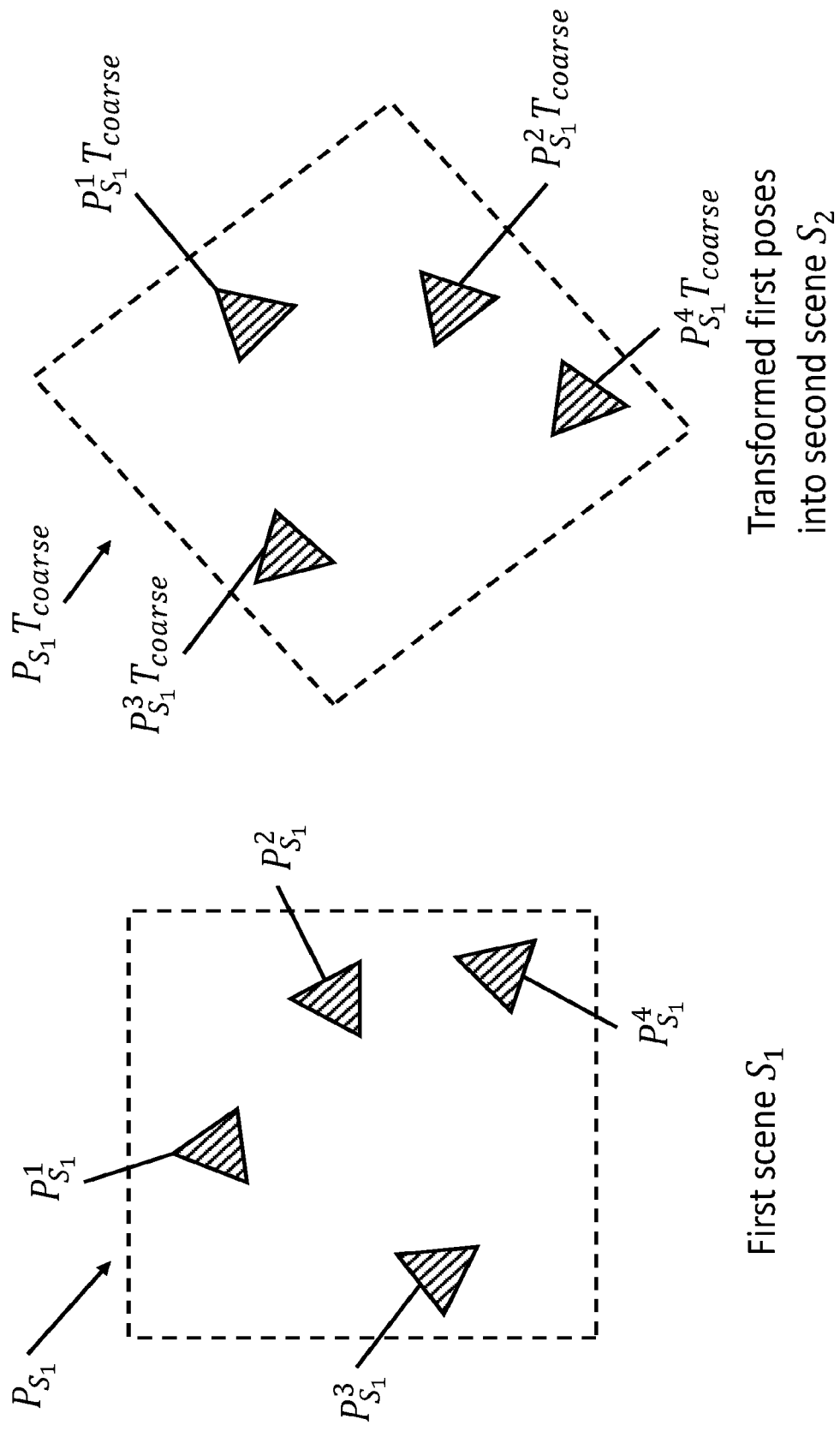
FIG. 4 is a schematic depiction of the transformation of the first poses $\{P_{S_1}=P_{S_1}^{\ 1}, P_{S_1}^{\ 2}, P_{S_1}^{\ 3}, P_{S_1}^{\ 4}T_{coarse}\}$ in accordance with the coarse scene transform $T_{coarse}$ to compute transformed first poses $P_{Se}$ in second scene $S_2$: $P_{S_2}=\{P_{S_1}^{\ 1}T_{coarse}, P_{S_1}^{\ 2}T_{coarse}, P_{S_1}^{\ 3}T_{coarse}P_{S_1}^{\ 4}T_{coarse}\}$ in accordance with one embodiment of the present disclosure.

In some embodiments of the present disclosure, the characterization system 100 performs the matching between the first poses in $\{P_{S_1}^1, P_{S_1}^2, \ldots, P_{S_1}^i, \ldots, P_{S_1}^n\}$ of the objects in first scene $S_1$ with the second plurality of estimated poses $\{Q_{S_2}^1, Q_{S_2}^2, \ldots, Q_{S_3}^i, \ldots, Q_{S_4}^n\}$ of the same objects in second scene $S_2$ based on a greedy search. In such embodiments, the centroids of the visible objects in the first scene $S_1$, as represented by their poses $\{P_{S_1}^1, P_{S_1}^2, \ldots, P_{S_1}^i, \ldots, P_{S_1}^n\}$, are transformed based on the coarse scene transformation $T_{coarse}$ and matched with the second poses $\{Q_{S_2}^1, Q_{S_2}^2, \ldots, Q_{S_3}^i, \ldots, Q_{S_4}^n\}$ in the second scene $S_2$. FIG. 4 is a schematic depiction of the transformation of the first poses $\{P_{S_1}^1, P_{S_1}^2, \ldots, P_{S_1}^i, \ldots, P_{S_1}^4\}$ in accordance with the coarse scene transformation $T_{coarse}$ to compute coarsely transformed first poses $P_{S_2}$ in second scene $S_2$:

$$P_{S_2} = \{P_{S_1}^1 T_{coarse}, P_{S_1}^2 T_{coarse}, P_{S_1}^3 T_{coarse}, P_{S_1}^4 T_{coarse}\}$$

in accordance with one embodiment of the present disclosure.

Figure 5:
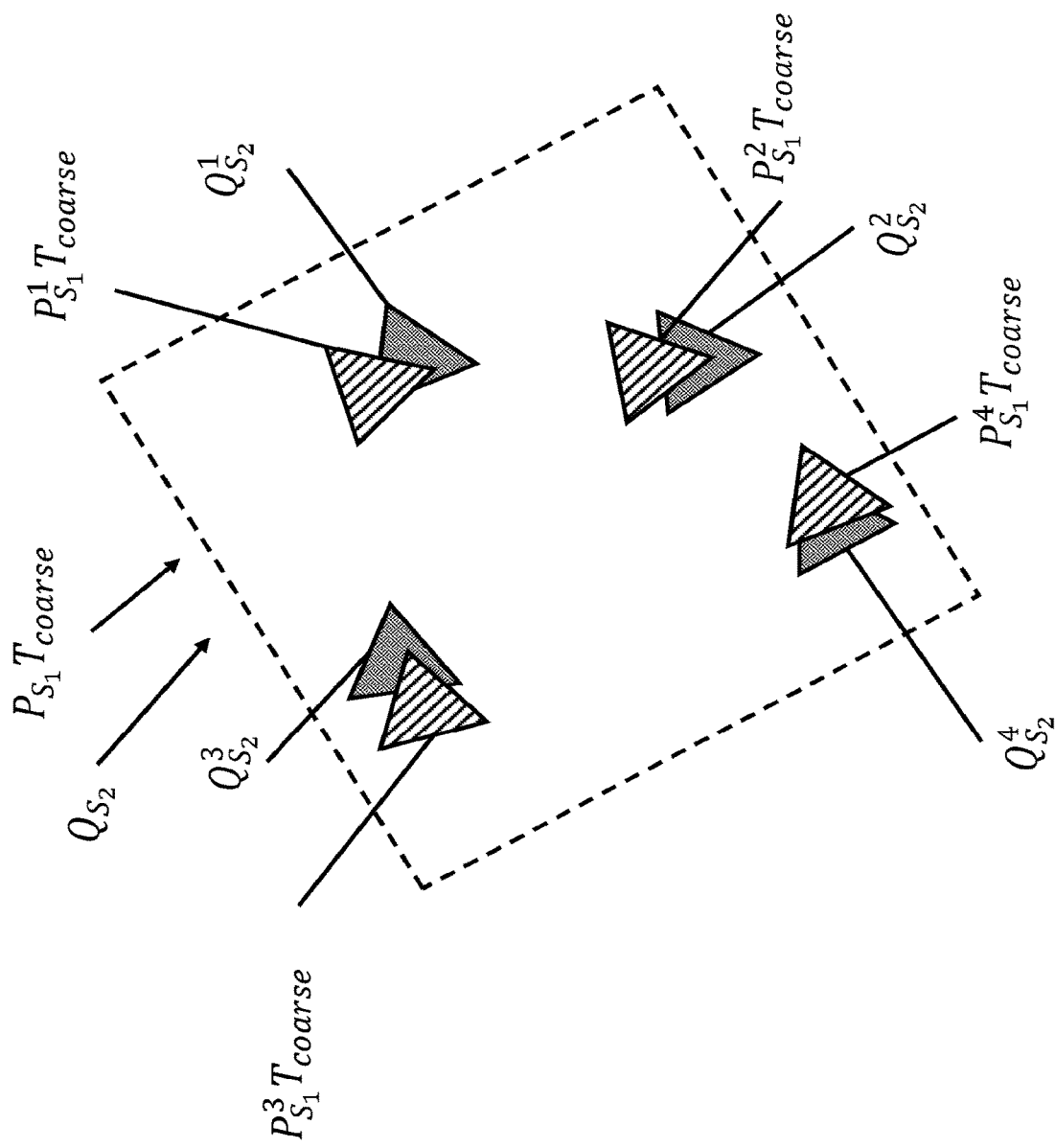
FIG. 5 is a schematic depiction of the overlay of the coarsely transformed first poses $P_{Se}$ onto the second poses $Q_{S_2}$ in accordance with one embodiment of the present disclosure.

FIG. 5 is a schematic depiction of the overlay of the coarsely transformed first poses $P_{S_2}$ onto the second poses $Q_{S_2}$ in accordance with one embodiment of the present disclosure. In the example shown in FIG. 5, the coarsely transformed first poses $P_{S_2} T_{coarse}$ are close in location to corresponding ones of the second poses $Q_{S_2}$.

For example, for each coarsely transformed first pose $P_{S_1}^i T_{coarse}$, find the closest second pose $Q_{S_3}^j$, based on position, where the greedy search searches through different pairings of the first poses with the second poses to minimize the overall error (e.g., sum of the differences in position between the coarsely transformed first poses and the second poses). In more detail, in some embodiments, the pose estimator 10 constructs a cost matrix of size N×M where N is number of poses in scene 1 ($S_1$) and j ... M is number of poses in scene 2 ($S_2$), and where each element of the cost matrix is the centroid difference between each pose. The pose estimator 10 then performs a linear sum assignment to determine the optimal matches.

In some embodiments of the present disclosure, the characterization system 100 performs the matching between the first poses in $\{P_{S_1}^1, P_{S_1}^2, \ldots, P_{S_1}^i, \ldots, P_{S_1}^n\}$ of the objects in first scene $S_1$ with the second plurality of estimated poses $\{Q_{S_2}^1, Q_{S_2}^2, \ldots, Q_{S_3}^i, \ldots, Q_{S_4}^n\}$ of the same objects in second scene $S_2$ based on maximal matching in a bipartite graph problem, where edges connect the estimated poses $\{P_{S_2}^1, P_{S_1}^2, \ldots, P_{S_1}^i, \ldots, P_{S_1}^n\}$ in the first scene $S_1$ transformed to the second scene $S_2$ using the coarse scene transformation $T_{coarse}$, with matchable estimated poses selected from the second poses $\{Q_{S_2}^1, Q_{S_2}^2, \ldots, Q_{S_3}^i, \ldots, Q_{S_4}^n\}$ in the second scene $S_2$. An estimated pose is considered correctly matched if the resulting matching includes an edge connecting the pose of an object in the first scene $S_1$ with a corresponding pose in the second scene $S_2$.

In some embodiments of the present disclosure, there may be mismatches in the poses. For example, the pose estimation system 10 may estimate poses for a different number of objects in the first scene $S_1$ versus the second scene $S_2$ or estimate poses for different objects (e.g., five objects A, B, C, D, and E in the first scene $S_1$ and five objects A, B, D, E, and F in the second scene $S_2$). These differences may be due, for example, to noise or instability in the pose estimation system 10 or asymmetries in the performance of the pose estimation system 10.

In some embodiments of the present disclosure, instead of using a greedy search to perform matching of poses, a false-positive threshold approach is applied instead to match coarsely transformed first poses $P_{S_2}$ with second poses $Q_{S_2}$. In more detail, for each pose $p_{S_2}$ of the coarsely transformed first poses $P_{S_2}$, the characterization system 100 identifies a closest pose $q_{S_2}$ of the second poses $Q_{S_2}$. If the closest pose $q_{S_2}$ of the second poses $Q_{S_2}$ is less than a false-positive threshold distance (e.g., 3 millimeters) away from the current pose $p_{S_2}$ of the coarsely transformed first poses $P_{S_2}$ (e.g., where the poses are located at the centroids of the corresponding objects), then that closest second pose $q_{S_2}$ is treated as a match or a corresponding pose. If the closest second pose $q_{S_2}$ is more than the false-positive threshold distance away, then those poses are treated as outliers and not counted among the matching poses for purposes of refining the transformation. In another embodiment of the present disclosure, instead of comparing the distances of the centroids, the CAD models corresponding to the objects are placed and oriented in accordance with their computed poses, The volume of the intersection of the two CAD models (for the coarsely transformed first pose $p_{S_2}$ and the closest second pose $q_{S_2}$) is then divided by the volume of a single one of the CAD models (or divided by the volume of the union of the two CAD models, in accordance with an intersection-over-union metric). In the case of perfect measurements of the poses, the quotient is 1, and where the CAD models do not align at all, then the quotient is 0. Accordingly, in some embodiments, a false-positive threshold may be set based on an intersection metric (e.g., intersection over a single instance or intersection over union) where an intersection metric exceeding the false-positive threshold intersection (e.g., where the intersection metric is a value greater than 0.80) is determined to satisfy the threshold for determining that the coarsely transformed first pose $p_{S_2}$ and the closest second pose $q_{S_2}$ match.

After performing the matching, it is assumed that first pose N, and second pose $Q_{S_3}^i$ refer to the same object i in the first scene $S_1$ and the second scene $S_2$, respectively.

In operation 260, the characterization system 100 computes a refined scene transform $T_{S_1 S_2}$ from first scene $S_1$ to second scene $S_2$, starting from the coarse scene transformation $T_{coarse}$ (e.g., initially setting $T_{current} = T_{coarse}$), where the refinement of the current rigid transformation $T_{current}$ is based on improving the alignment of the transformed first poses with their corresponding matching second poses, as computed in operation 250. In more detail, some aspects of embodiments of the present disclosure relate to refining the transform by minimizing the below cost function for all of the matched poses $(P_{S_1}^i, Q_{S_3}^i)$:

$$\min_{T_{S_1 S_2}} \frac{1}{n} \sum_{i,j} \left\| P_{S_1}^i T_{S_1 S_2} x_j - Q_{S_3}^i x_j \right\| \tag{8}$$

where $x_j$ is a predefined set of points (e.g., [0,0,1], [0,1,0], and [1,0,0], although embodiments of the present disclosure are not limited thereto). If the points are set to [0,0,0], then this function is equivalent to a 3-D rigid body transform.

For example, referring back to FIG. 5, the positions and orientations of the transformed first poses $P_{S_1} T_{coarse}$ are close to the second poses $Q_{S_2}$, but do not align exactly with the second poses. The differences in positions of these poses are represented in the above cost function (8) by the difference: $P_{S_1}{}^i T_{S_1 S_2} x_j - Q_{S_2}{}^i x_j$.

In some embodiments of the present disclosure, the refinement process is an iterative operation (such as by applying gradient descent) to update the current rigid transformation $T_{current}$ until the cost function is minimized (e.g., until a threshold condition has been met, such as reaching a set number of iterations or where the improvement from one iteration to the next is less than a threshold value), at which point the updated value of $T_{current}$ is output as the refined scene transformation $T_{S_1 S_2}$.

Accordingly, in operation 260, the characterization system 100 computes a refined scene transformation $T_{S_1 S_2}$ by minimizing the cost function (e.g., error or differences between the poses of the objects as captured in the first scene $S_1$ and the second scene $S_2$.).

Figure 6:
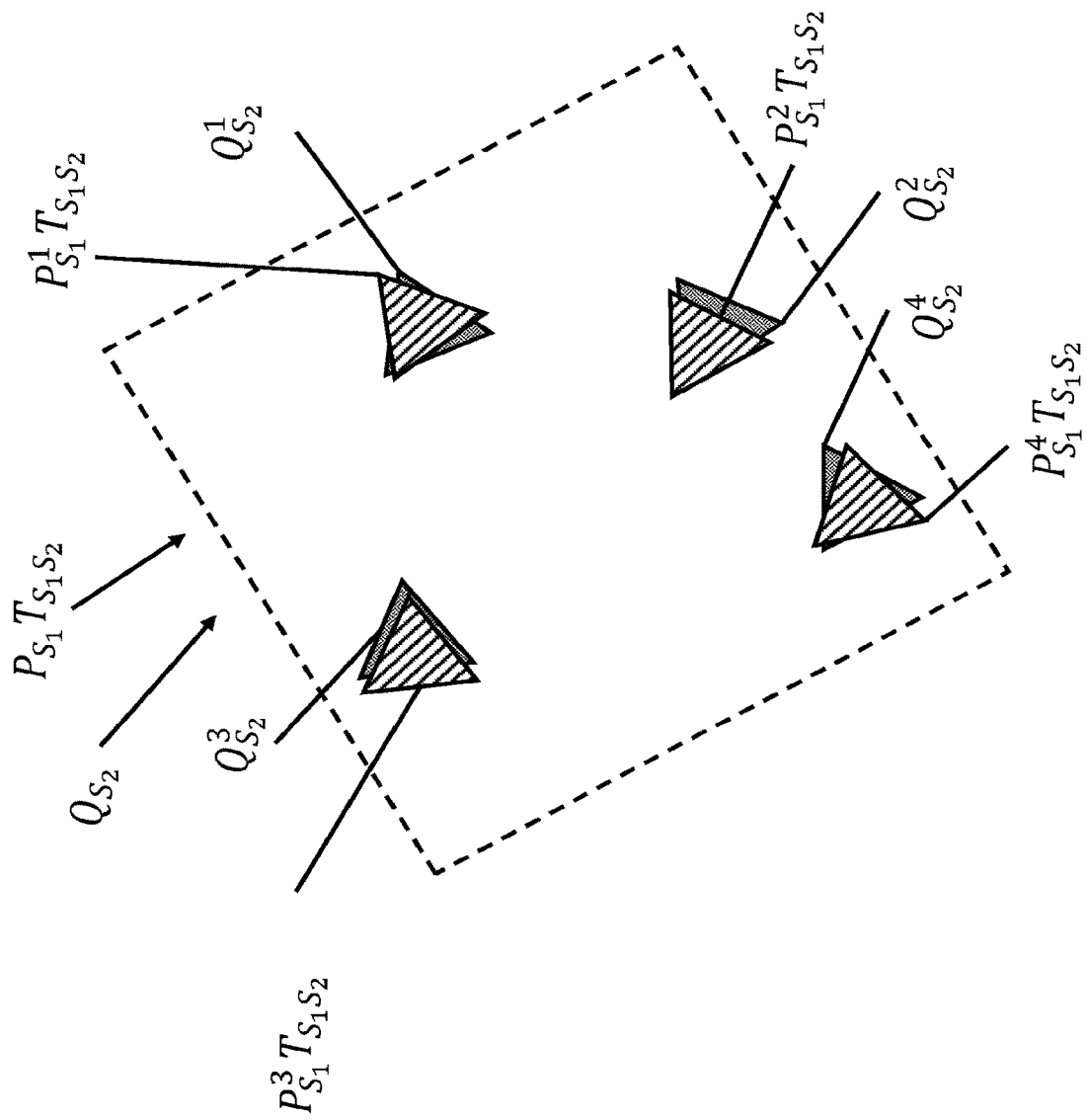
FIG. 6 is a schematic depiction in which the first poses $P_{S_1}$ are transformed by a refined scene transformation $T_{S_1S_2}$ to produce transformed first poses $P_{S_1}T_{S_1S_2}$ that are closer to their corresponding poses $Q_{S_2}$ than the coarsely transformed first poses $P_{S_1}T_{coarse}$ according to one embodiment of the present disclosure.

FIG. 6 is a schematic depiction in which the first poses $P_{S_1}$ are transformed by a refined scene transformation $T_{S_1 S_2}$ to produce transformed first poses (or finely transformed first poses) $P_{S_1} T_{S_1 S_2}$ that are closer to their corresponding poses $Q_{S_2}$ than the coarsely transformed first poses $P_{S_1} T_{coarse}$ according to one embodiment of the present disclosure. Note, however, that while the refined scene transformation $T_{S_1 S_2}$ brings the first poses closer to the second poses $Q_{S_2}$, some differences in the position and orientation of the poses remain. These remaining differences represent the pose errors, including translation and rotation errors, of the pose estimation system 10.

In operation 270, characterization system 100 characterizes the pose estimation system 100 based on the refined scene transformation $T_{S_1 S_2}$ and the computed first and second poses. In particular, after minimizing the cost function above to compute a refined scene transformation $T_{S_1 S_2}$ that minimizes the differences between the pose estimates of the arrangement 20 of objects 22 as depicted in the first scene $S_1$ and the second scene $S_2$, any remaining differences in the estimated poses are assumed to be the result of errors or inaccuracies caused by the pose estimation system 100 (e.g., based on the assumption that physical rigid transformation applied to the arrangement of objects did not cause any shifts in the relative positions of the objects). More formally, the errors may be calculated in accordance with Equations (1) and (2), where the refined scene transformation $T_{S_1 S_2}$ represents the rigid transformation applied to the first poses $\{P_{S_1}{}^1, P_{S_1}{}^2, \ldots, P_{S_1}{}^i, \ldots, P_{S_1}{}^n\}$ from the first scene $S_1$ to the second poses $\{Q_{S_2}{}^1, Q_{S_2}{}^2, \ldots, Q_{S_3}{}^i, \ldots, Q_{S_4}{}^n\}$ from the second scene $S_2$:

$$(P_{S_1} T_{S_1 S_2}) P_{err} = Q_{S_2} \qquad (9)$$

$$P_{err} = (P_{S_1} T_{S_1 S_2})^{-1} Q_{S_2} \qquad (10)$$

As such, following the approach of equations (3) and (4), the rotation error $R_{err}$ and translation error $T_{err}$ characterizing the error of a pose estimation system 10 may be computed as:

$$R_{err} = \frac{1}{n} \sum_i \left\| R\left( (P_{S_1}^i T_{S_1 S_2})^{-1} Q_{S_2}^i \right) \right\| \qquad (11)$$

$$T_{err} = \frac{1}{n} \sum_i \left\| T\left( (P_{S_1}^i T_{S_1 S_2})^{-1} Q_{S_2}^i \right) \right\| \qquad (12)$$

where, as above, the function R( ) converts its argument into an axis-angle where the magnitude is the rotation difference, and the function T( ) extracts the translation component of the pose matrix from its argument. In particular:

$$R((P_{S_1}^i T_{S_1 S_2})^{-1} Q_{S_2}^i) = \cos^{-1}(Tr(R_{PS_2}^i \cdot (R_{PS_2}^i)^{-1})^{-1})/2 \qquad (13)$$

$$T((P_{S_1}^i T_{S_1 S_2})^{-1} Q_{S_2}^i) = \| T_{QS_2}^i - T_{PS_2}^i \| \qquad (14)$$

In the example shown in FIG. 6, pose pairings $(P_{S_1}{}^1 T_{S_1 S_2}, Q_{S_2}{}^1)$ and $(P_{S_1}{}^4 T_{S_1 S_2}, Q_{S_2}{}^4)$ exhibit greater rotation error $R_{err}$, while pose pairings $(P_{S_1}{}^1 T_{S_1 S_2}, Q_{S_2}{}^2)$ and $(P_{S_1}{}^3 T_{S_1 S}{}^2, Q_{S_2}{}^3)$ exhibit greater translation error $T_{err}$.

This procedure can be repeated across multiple pairs of scenes (e.g., multiple different arrangements of different objects, where the arrangements are rigidly transformed to produce pairs of scenes) to compute a variance, maximum, and expected value for the various pose error measurements for a particular pose estimation system. These values then allow the performance of different pose estimation systems to be compared against one another.

In some experiments with approaches in accordance with embodiments of the present disclosure, a pose characterization system was used to accurately predict pose errors made by pose estimators to a precision of less than equal to 30 microns in translation error $T_{err}$ and less than or equal to 0.3 degrees in rotational error $R_{err}$. This enables the evaluation of whether such pose estimation systems are capable of performing to particular high-precision design constraints, such as a desired precision of less than 200 microns of translation error and less than 1 degree of rotation error at a distance of approximately 1 meter, whereas such high-precision measurements of the error characterization of pose estimation systems may otherwise have been impossible or expensive to implement.

As such, aspects of embodiments of the present disclosure provide systems and methods for characterizing the performance (e.g., accuracy and precision) of pose estimation systems at a high level of precision without relying on an external source of ground truth.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for characterizing a pose estimation system, comprising:
receiving, from a pose estimation system configured to estimate poses of objects with respect to a reference coordinate system, by a characterization system comprising a processor and a memory, a first plurality of poses of an arrangement of objects in a first scene;
receiving, from the pose estimation system, by the characterization system, a second plurality of poses of the arrangement of objects in a second scene, the second scene being a rigid transformation of the arrangement of objects of the first scene with respect to the pose estimation system;
computing, by the characterization system, a coarse scene transformation between the first scene and the second scene;
matching, by the characterization system, corresponding poses between the first plurality of poses and the second plurality of poses;
computing, by the characterization system, a refined scene transformation between the first scene and the second scene based on coarse scene transformation, the first poses, and the second poses;

transforming, by the characterization system, the first plurality of poses, received from the pose estimation system, based on the refined scene transformation to compute a plurality of transformed first poses; and computing an average rotation error and an average translation error of the pose estimation system based on differences between the transformed first poses and the second plurality of poses received from the pose estimation system.

2. The method of claim 1, wherein the rigid transformation of the arrangement of objects with respect to the pose estimation system comprises: a rotation of the arrangement of objects.

3. The method of claim 1, wherein the arrangement of objects is on a support platform, and wherein the characterization system is configured to control the support platform to rigidly transform the arrangement of objects with respect to the pose estimation system.

4. The method of claim 1, wherein a fiducial, adjacent the arrangement of objects, is imaged in the first scene, rigidly transformed with the arrangement of objects, and imaged in the second scene, and wherein the coarse scene transformation between the first scene and the second scene is computed based on computing a first pose of the fiducial imaged in the first scene and a second pose of the fiducial imaged in the second scene.

5. The method of claim 1, wherein the matching the corresponding poses between the first plurality of poses and the second plurality of poses is performed by:

transforming the first plurality of poses in accordance with the coarse scene transformation to compute a plurality of coarsely transformed first poses; and for each coarsely transformed first pose of the first coarsely transformed first poses:

identifying a second pose of the second poses closest to the coarsely transformed first pose; and determining that the transformed first pose and the second pose closest to the coarsely transformed first pose match when a distance between the coarsely transformed first pose and the second pose closest to the coarsely transformed first pose is less than a false-positive threshold distance.

6. The method of claim 1, wherein the matching the corresponding poses between the first plurality of poses and the second plurality of poses is performed by:

transforming the first plurality of poses in accordance with the coarse scene transformation to compute a plurality of coarsely transformed first poses; and for each coarsely transformed first pose of the first coarsely transformed first poses:

identifying a second pose of the second poses closest to the coarsely transformed first pose;

identifying a type of an object corresponding to the coarsely transformed first pose and the second pose;

positioning a first 3-D model of the type of the object at the coarsely transformed first pose;

positioning a second 3-D model of the type of the object at the second pose; and determining that the coarsely transformed first pose and the second pose closest to the coarsely transformed first pose match when an intersection between the positioned first 3-D model and the positioned second 3-D model satisfies a false-positive threshold intersection.

7. The method of claim 1, wherein the computing the refined scene transformation comprises:

initializing a current scene transformation based on the coarse scene transformation;

computing a plurality of first poses as transformed by the current scene transformation; and updating the current scene transformation in accordance with reducing a cost function computed based on differences between the second poses and the first poses as transformed by the current scene transformation.

8. The method of claim 1, wherein the average rotation error is computed based on a sum of the rotation errors between the differences between rotational components of the transformed first poses and the second plurality of poses, and wherein the average translation error is computed based on a sum of the translation errors between the differences between translation components of the transformed first poses and the second plurality of poses.

9. The method of claim 8, wherein the average rotation error $R_{err}$ is computed in accordance with:

$$R_{err} = \frac{1}{n}\sum_i \left\| R\!\left(\left(P^i_{S_1} T_{S_1 S_2}\right)^{-1} Q^i_{S_2}\right)\right\|,$$

and wherein the average translation error $T_{err}$ is computed in accordance with:

$$T_{err} = \frac{1}{n}\sum_i \left\| T\!\left(\left(P^i_{S_1} T_{S_1 S_2}\right)^{-1} Q^i_{S_2}\right)\right\|,$$

where $P_{S_1}^i$ is an i-th pose of the first poses, $Q_{S_2}^i$ is an i-th pose of the second poses, $T_{S_1 S_2}$ is the refined scene transformation from the first scene $S_1$ to the second scene $S_2$, and n is the number of first poses and the number of second poses.

10. A system for characterizing a pose estimation system, comprising:

a processor; and a memory storing instructions that, when executed by the processor, cause the processor to:

receive, from a pose estimation system configured to estimate poses of objects with respect to a reference coordinate system, a first plurality of poses of an arrangement of objects in a first scene;

receive, from the pose estimation system, a second plurality of poses of the arrangement of objects in a second scene, the second scene being a rigid transformation of the arrangement of objects of the first scene with respect to the pose estimation system;

compute a coarse scene transformation between the first scene and the second scene;

match corresponding poses between the first plurality of poses and the second plurality of poses;

compute a refined scene transformation between the first scene and the second scene based on coarse scene transformation, the first poses, and the second poses;

transform the first plurality of poses, received from the pose estimation system, based on the refined scene transformation to compute a plurality of transformed first poses; and compute an average rotation error and an average translation error of the pose estimation system based on differences between the transformed first poses and the second plurality of poses received from the pose estimation system.

11. The system of claim 10, wherein the rigid transformation of the arrangement of objects with respect to the pose estimation system comprises a rotation of the arrangement of objects.

12. The system of claim 10, further comprising a support platform, and wherein the memory further stores instructions that, when executed by the processor, cause the processor to control the support platform to rigidly transform the arrangement of objects with respect to the pose estimation system from the first scene to the second scene.

13. The system of claim 10, wherein a fiducial, adjacent the arrangement of objects, is imaged in the first scene, rigidly transformed with the arrangement of objects, and imaged in the second scene, and wherein the coarse scene transformation between the first scene and the second scene is computed based on computing a first pose of the fiducial imaged in the first scene and a second pose of the fiducial imaged in the second scene.

14. The system of claim 10, wherein the memory further stores instructions that, when executed by the processor, cause the processor to match the corresponding poses between the first plurality of poses and the second plurality of poses by:

transforming the first plurality of poses in accordance with the coarse scene transformation to compute a plurality of transformed first poses; and for each transformed first pose of the first transformed first poses:
identifying a second pose of the second poses closest to the transformed first pose; and
determining that the transformed first pose and the second pose closest to the transformed first pose match when a distance between the transformed first pose and the second pose closest to the transformed first pose is less than a false-positive threshold distance.

15. The system of claim 10, wherein the memory further stores instructions that, when executed by the processor, cause the processor to match the corresponding poses between the first plurality of poses and the second plurality of poses by:

transforming the first plurality of poses in accordance with the coarse scene transformation to compute a plurality of transformed first poses; and for each transformed first pose of the first transformed first poses:
identifying a second pose of the second poses closest to the transformed first pose;
identifying a type of an object corresponding to the transformed first pose and the second pose;
positioning a first 3-D model of the type of the object at the transformed first pose;
positioning a second 3-D model of the type of the object at the second pose; and
determining that the transformed first pose and the second pose closest to the transformed first pose match when an intersection between the positioned first 3-D model and the positioned second 3-D model satisfies a false-positive threshold intersection.

16. The system of claim 10, wherein the memory further stores instructions that, when executed by the processor, cause the processor to compute the refined scene transformation by:

initializing a current scene transformation based on the coarse scene transformation;

computing a plurality of first poses as transformed by the current scene transformation; and updating the current scene transformation in accordance with reducing a cost function computed based on differences between the second poses and the first poses as transformed by the current scene transformation.

17. The system of claim 10, wherein the memory further stores instructions that, when executed by the processor, cause the processor to:

compute the average rotation error based on a sum of the rotation errors between the differences between rotational components of the transformed first poses and the second plurality of poses, and compute the average translation error based on a sum of the translation errors between the differences between translation components of the transformed first poses and the second plurality of poses.

18. The system of claim 17, wherein the average rotation error $R_{err}$ is computed in accordance with:

$$R_{err} = \frac{1}{n}\sum_i \left\| R\left((P^i_{S_1} T_{S_1 S_2})^{-1} Q^i_{S_2}\right) \right\|,$$

and wherein the average translation error $T_{err}$ is computed in accordance with:

$$T_{err} = \frac{1}{n}\sum_i \left\| T\left((P^i_{S_1} T_{S_1 S_2})^{-1} Q^i_{S_2}\right) \right\|,$$

where $P_{S_1}^i$ is an i-th pose of the first poses, $Q_{S_2}^i$ is an i-th pose of the second poses, $T_{S_1 S_2}$ is the refined scene transformation from the first scene $S_1$ to the second scene $S_2$, and n is the number of first poses and the number of second poses.

* * * * *